US012683649B2

(12) United States Patent
Weerasinghe et al.

(10) Patent No.: US 12,683,649 B2
(45) Date of Patent: Jul. 14, 2026

(54) DISCRETE MULTITONE BASED WIRELINE TELEMETRY SYSTEM FOR SINGLE-MODE TELEMETRY APPLICATIONS

(71) Applicant: Schlumberger Technology Corporation, Sugar Land, TX (US)

(72) Inventors: Nalin Weerasinghe, Sagamihara (JP); Adolfo Leon Recio, Clamart (FR); Hiroshi Nomura, Sagamihara (JP); Robert W. Tennent, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/931,611

(22) Filed: Oct. 30, 2024

(65) Prior Publication Data

US 2026/0121687 A1 Apr. 30, 2026

(51) Int. Cl.
*H04B 3/54* (2006.01)
*H04L 41/0896* (2022.01)

(52) U.S. Cl.
CPC ......... *H04B 3/542* (2013.01); *H04L 41/0896* (2013.01); *H04B 2203/5475* (2013.01)

(58) Field of Classification Search
CPC .......... H04B 2203/5475; H04L 41/089; H04L 41/0896
See application file for complete search history.

(56) References Cited

U.S. PATENT DOCUMENTS

| | | | | |
|---|---|---|---|---|
| 6,873,653 B1 * | 3/2005 | Rezvani | .................... | H04L 5/16 |
| | | | | 375/222 |
| 6,892,339 B1 * | 5/2005 | Polk, Jr. | .............. | H04L 27/2626 |
| | | | | 714/746 |
| 7,787,525 B1 * | 8/2010 | Clark, Jr. | ................ | E21B 47/13 |
| | | | | 702/6 |
| 9,512,716 B2 | 12/2016 | Liu | | |
| 9,982,528 B2 | 5/2018 | Recio | | |
| 2005/0285753 A1 * | 12/2005 | Shah | ........................ | E21B 47/12 |
| | | | | 340/854.9 |
| 2016/0003035 A1 | 1/2016 | Logan | | |
| 2019/0229767 A1 * | 7/2019 | Olson | ...................... | H04B 3/32 |
| 2021/0087927 A1 | 3/2021 | Miller | | |
| 2021/0238992 A1 * | 8/2021 | Zeng | ........................ | H04L 5/006 |
| 2024/0368979 A1 | 11/2024 | Solem | | |
| 2025/0308376 A1 | 10/2025 | Maclean | | |

FOREIGN PATENT DOCUMENTS

EP 2876256 A1 5/2015

* cited by examiner

*Primary Examiner* — Steven Lim
(74) *Attorney, Agent, or Firm* — Jeffrey D. Frantz

(57) ABSTRACT

The present disclosure provides techniques and apparatus for discrete multitone (DMT) modulation communications for single-mode telemetry. An example technique involves a surface acquisition module initiating a first training sequence with a downhole telemetry module using a first bandwidth of a plurality of bandwidths via a communication link between the surface acquisition module and the downhole telemetry module. A second bandwidth of the plurality of bandwidths is automatically selected for a communication session between the surface acquisition module and the downhole telemetry module using the communication link, based on the first training sequence. The second bandwidth is greater than the first bandwidth. Data is exchanged with the downhole telemetry module during the communication session based on the second bandwidth.

20 Claims, 26 Drawing Sheets

1600

ENTER

MOVE 1 BIT OR 2 BITS FROM THE TONE WITH WORST SNR MARGIN — 1602

SUCCEED? — 1604

YES

NO

MAX # OF TONES TO CHANGE REACHES? MAX # OF ITERATION REACHED? — 1606

EXIT

• 1 BIT TO ANOTHER USED TONE

• 1 BIT, TOGETHER WITH ANOTHER 1 BIT, TO UNUSED TONE (ENABLE TONE)

• 2 BITS (DISABLE TONE) TO 1 UNUSED TONE (ENABLE TONE)

• 2 BITS (DISABLE TONE) TO 1 USED TONE OR 2 USED TONES

2700

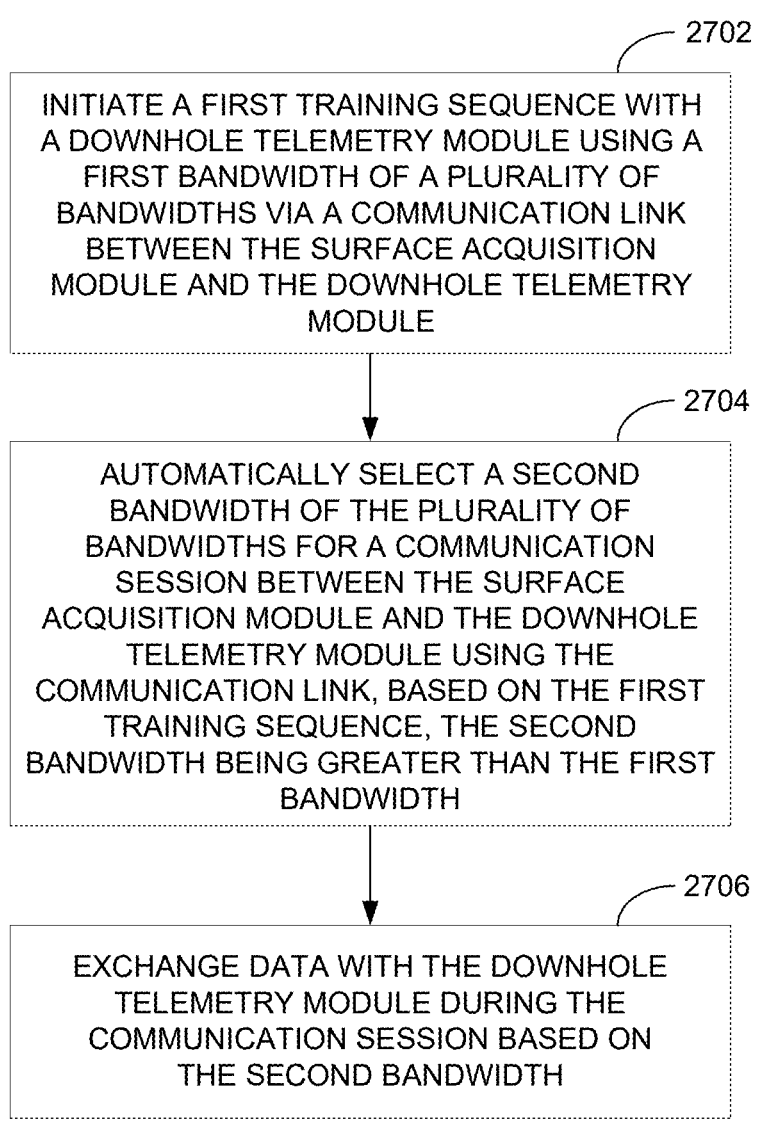

2702

INITIATE A FIRST TRAINING SEQUENCE WITH A DOWNHOLE TELEMETRY MODULE USING A FIRST BANDWIDTH OF A PLURALITY OF BANDWIDTHS VIA A COMMUNICATION LINK BETWEEN THE SURFACE ACQUISITION MODULE AND THE DOWNHOLE TELEMETRY MODULE

2704

AUTOMATICALLY SELECT A SECOND BANDWIDTH OF THE PLURALITY OF BANDWIDTHS FOR A COMMUNICATION SESSION BETWEEN THE SURFACE ACQUISITION MODULE AND THE DOWNHOLE TELEMETRY MODULE USING THE COMMUNICATION LINK, BASED ON THE FIRST TRAINING SEQUENCE, THE SECOND BANDWIDTH BEING GREATER THAN THE FIRST BANDWIDTH

2706

EXCHANGE DATA WITH THE DOWNHOLE TELEMETRY MODULE DURING THE COMMUNICATION SESSION BASED ON THE SECOND BANDWIDTH

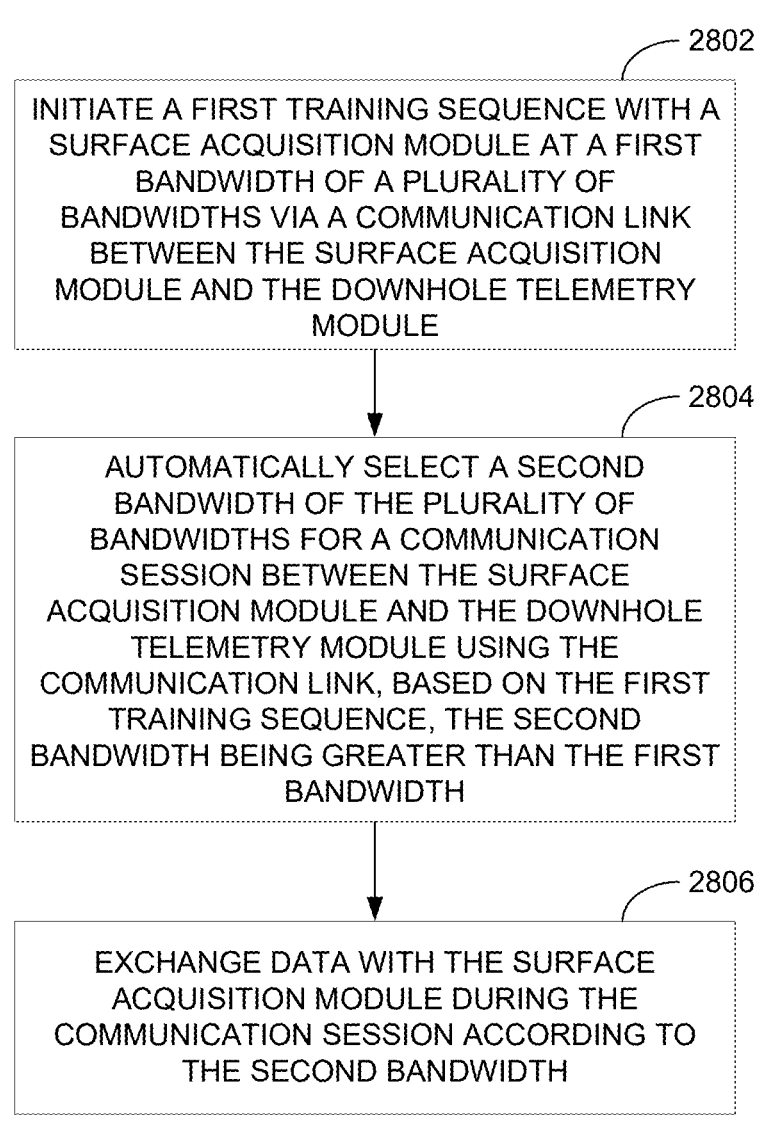

2802

INITIATE A FIRST TRAINING SEQUENCE WITH A SURFACE ACQUISITION MODULE AT A FIRST BANDWIDTH OF A PLURALITY OF BANDWIDTHS VIA A COMMUNICATION LINK BETWEEN THE SURFACE ACQUISITION MODULE AND THE DOWNHOLE TELEMETRY MODULE

2804

AUTOMATICALLY SELECT A SECOND BANDWIDTH OF THE PLURALITY OF BANDWIDTHS FOR A COMMUNICATION SESSION BETWEEN THE SURFACE ACQUISITION MODULE AND THE DOWNHOLE TELEMETRY MODULE USING THE COMMUNICATION LINK, BASED ON THE FIRST TRAINING SEQUENCE, THE SECOND BANDWIDTH BEING GREATER THAN THE FIRST BANDWIDTH

2806

EXCHANGE DATA WITH THE SURFACE ACQUISITION MODULE DURING THE COMMUNICATION SESSION ACCORDING TO THE SECOND BANDWIDTH

FIG. 28

DISCRETE MULTITONE BASED WIRELINE TELEMETRY SYSTEM FOR SINGLE-MODE TELEMETRY APPLICATIONS

BACKGROUND

Field of the Disclosure

The present disclosure generally relates to discrete multitone (DMT) modulation. More specifically, the present disclosure relates to a DMT-based wireline telemetry system for single-mode telemetry applications.

Description of Related Art

Hydrocarbon fluids, such as oil and natural gas, may be obtained from a subterranean geologic formation, referred to as a reservoir, by drilling a well that penetrates a hydrocarbon-bearing formation. A variety of downhole tools (e.g., wireline instruments, logging-while-drilling instruments, etc.) may be used in various areas of oil and natural gas services. In some cases, downhole tools may be used in a well for surveying, drilling, and production of hydrocarbons. For example, data regarding surrounding earth formations may be collected by the downhole tools. The downhole tools may analyze the collected data and transmit the collected data and the results of the analysis to the surface where further analysis is performed.

In certain cases, the downhole tools may communicate with the surface via discrete multitone (DMT) communications. DMT is a technique for modulating a carrier with digital information and generally employs a group of carriers, each of which carries a portion of the data to be transferred. Each carrier may be digitally modulated with its portion of the data using, for example, quadrature phase shift keying (QPSK) or quadrature amplitude modulation (QAM), and may be transmitted over a communications medium, such as a cable or an optical medium.

QPSK represents a digital symbol (e.g., a group of bits to be transmitted) by phase shifting a carrier a different amount for each symbol. For example, in 8-QPSK, the modulator can apply eight different phase shifts to the carrier to represent eight different three-bit symbols. QAM represents a digital symbol by applying different phase shifts and amplitude adjustments for each symbol. For example, in 256-QAM, the modulator can apply 256 different combinations of phase shifts and amplitude adjustments to represent 256 different eight-bit symbols.

Demodulating a DMT signal may involve sampling the DMT signal, which is made up of a number of modulated carriers, at a sampling rate sufficient to preserve the information in the signal. The sampled signal is typically digitized and transformed into the frequency domain where it can be processed to recover the data that was used to create the DMT signal.

Although DMT systems have made great technological advancements over many years, challenges still exist. For example, complex and dynamic environments below and/or at the surface of a wellsite can attenuate and/or block signals between a surface acquisition module and downhole telemetry module at the wellsite. Accordingly, there is a continuous desire to improve the technical performance of DMT systems for wellbore communications, including, for example, improving speed and data carrying capacity of communications, improving efficiency of the use of communication mediums, improving the reliability of communications, and the like. Consequently, there exists a need for further improvements in DMT systems for wellbore communications.

SUMMARY

One embodiment of the present disclosure described herein is a method performed by a surface acquisition module in a discrete multitone (DMT) modulation system. The method includes initiating a first training sequence with a downhole telemetry module using a first bandwidth of a plurality of bandwidths via a communication link between the surface acquisition module and the downhole telemetry module. The method also includes automatically selecting a second bandwidth of the plurality of bandwidths for a communication session between the surface acquisition module and the downhole telemetry module using the communication link, based on the first training sequence, the second bandwidth being greater than the first bandwidth. The method further includes exchanging data with the downhole telemetry module during the communication session based on the second bandwidth.

Another embodiment of the present disclosure described herein in a method performed by a downhole telemetry module in a discrete multitone (DMT) modulation system. The method includes initiating a first training sequence with a surface acquisition module at a first bandwidth of a plurality of bandwidths via a communication link between the surface acquisition module and the downhole telemetry module. The method also includes automatically selecting a second bandwidth of the plurality of bandwidths for a communication session between the surface acquisition module and the downhole telemetry module using the communication link, based on the first training sequence, the second bandwidth being greater than the first bandwidth. The method further includes exchanging data with the surface acquisition module during the communication session according to the second bandwidth.

Another embodiment of the present disclosure described herein is a surface acquisition module. The surface acquisition module includes one or more memories collectively storing instructions, and one or more processors communicatively coupled to the one or more memories. The one or more processors are collectively configured to execute the instructions to cause the surface acquisition module to: initiate a first training sequence with a downhole telemetry module at a first bandwidth of a plurality of bandwidths via a communication link between the surface acquisition module and the downhole telemetry module; automatically select a second bandwidth of the plurality of bandwidths for a communication session between the surface acquisition module and the downhole telemetry module using the communication link, based on the first training sequence, the second bandwidth being greater than the first bandwidth; and exchange data with the downhole telemetry module during the communication session according to the second bandwidth.

The following description and the appended figures set forth certain features for purposes of illustration.

BRIEF DESCRIPTION OF DRAWINGS

Various embodiments in accordance with the present disclosure will be described with reference to the drawings, where like designations denote like elements. Note that the appended drawings illustrate typical embodiments and are therefore not to be considered limiting; other equally effective embodiments are contemplated.

FIG. 27 is a flow diagram depicting an example operations for DMT communications in a DMT-based wireline telemetry system, according to certain embodiments.

FIG. 28 is another flow diagram depicting an example operations for DMT communications in a DMT-based wireline telemetry system, according to certain embodiments.

DETAILED DESCRIPTION

Figure 1:
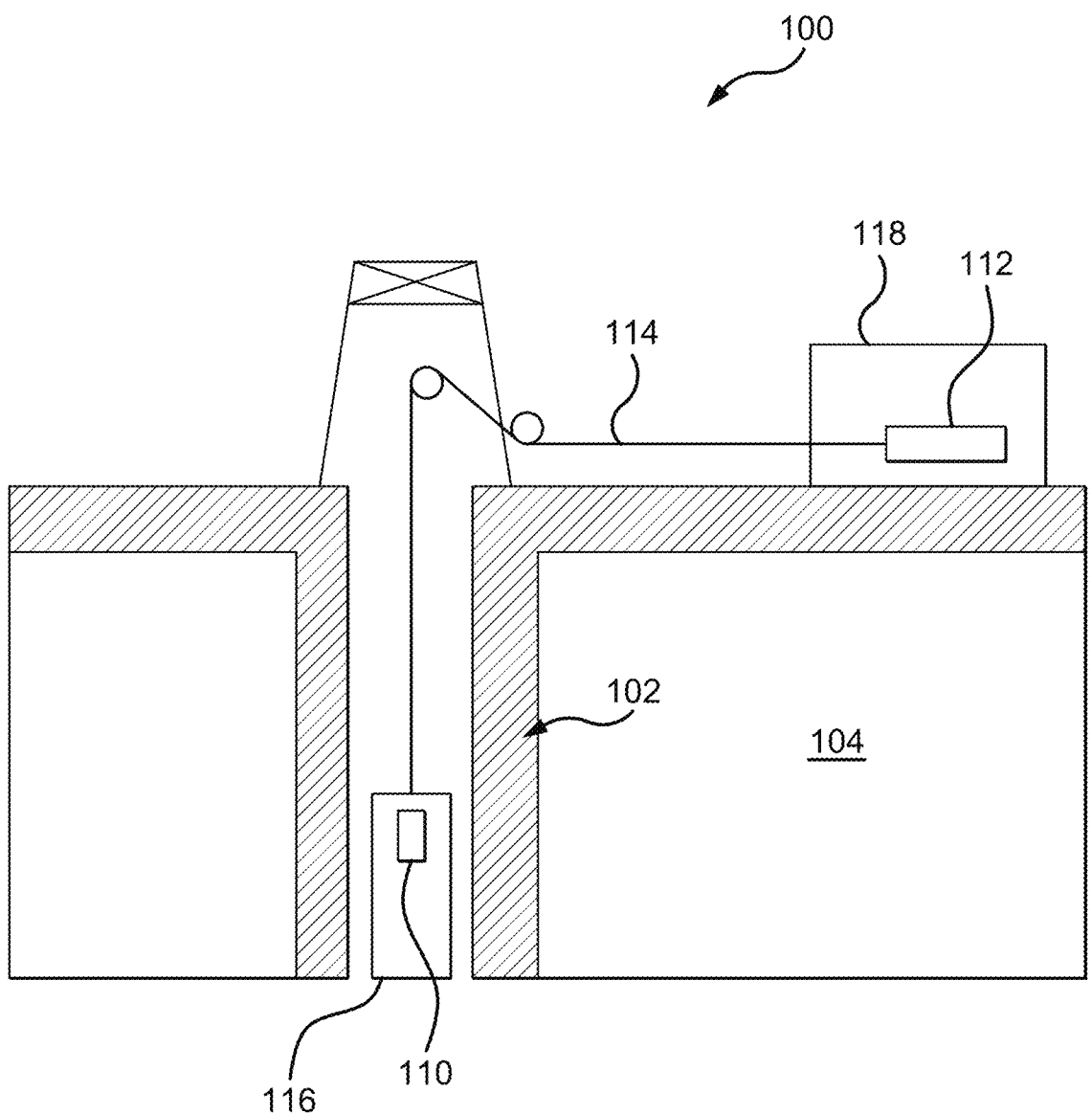
FIG. 1 is a schematic diagram of an example system, according to certain embodiments.

The present disclosure provides techniques, methods, systems, apparatus, and computer readable media for discrete multitone (DMT) communications for single-mode telemetry applications. Such single-mode telemetry applications may include cased-hole telemetry for production services, well intervention, horizontal well evaluation, slickline operations, and coiled tubing operations, as illustrative, non-limiting examples. The DMT-based system described herein can operate over various cables, such as monocables, coaxial cables, heptacables, IFC power cables, and slicklines, as illustrative, non-limiting examples.

The techniques, methods, systems, apparatus, and computer readable media for DMT communications for single-mode telemetry applications may provide various advantages. For example, compared to legacy telemetry systems, the DMT-based system described herein may provide a significantly enhanced noise tolerance, fully automatic system configuration, universal hardware able to run other telemetry protocols, support of re-transmission and error correction coding, real-time monitoring of communication status, and capability to run on extended well depths, among other advantages. Additionally, while certain legacy telemetry systems may utilize DMT communications, the present disclosure provides various techniques for maximizing (or at least improving) speed and bit error rate performance for the specific case of monocables and coaxial cables found in subsurface applications, such as oil & gas and geothermal, among others.

The following description includes embodiments of the best mode presently contemplated for practicing the described implementations. This description is not to be taken in a limiting sense, but rather is made merely for the purpose of describing the general principles of the implementations. The scope of the described implementations should be ascertained with reference to the issued claims.

Although the terms "first," "second," "third," etc., may be used herein to describe various elements, components, regions, layers and/or sections, these elements, components, regions, layers and/or sections should not be limited by these terms. These terms may be only used to distinguish one element, component, region, layer or section from another element, component, region, layer, or section. Terms such as "first," "second," and other numerical terms, when used herein, do not imply a sequence or order unless clearly indicated by the context. Thus, a first element, component, region, layer, or section discussed herein could be termed a second element, component, region, layer, or section without departing from the teachings of the example embodiments.

As used herein, a hyphenated form of a reference numeral refers to a specific instance of an element and the un-hyphenated form of the reference numeral refers to the collective element. Thus, for example, device "12-1" refers to an instance of a device class, which may be referred to collectively as devices "12" and any one of which may be referred to generically as a device "12". As used herein, the terms "carrier," "subcarrier," "frequency channel," "channel unit," "channel," and "tone" may be used interchangeably to refer to a frequency unit (or unit of frequency).

Example System for DMT Communications for Single-Mode Telemetry Applications

FIG. 1 is a schematic diagram of at least a portion of an example implementation of a wellsite system 100 that can be configured to support a DMT-based system for single-mode telemetry applications, according to various embodiments. In FIG. 1, an example wireline logging operation is illustrated with respect to the wellsite system 100. The wellsite system 100 is deployed in a wellbore 102 traversing a subsurface formation 104. A downhole telemetry module 110 (also referred to as a downhole telemetry equipment, a downhole telemetry system, or a downhole telemetry cartridge) is connected to a toolstring 116. In a well-logging operation, one or more tools may be connected to, included within, or otherwise coupled to the toolstring 116. The tools of the toolstring 116 may communicate with downhole telemetry circuits of the downhole telemetry module 110 via a bi-directional electrical interface.

In certain embodiments, the tool(s) of the toolstring 116 may be connected to the downhole telemetry module 110 over a common data bus. In certain other embodiments, each tool of the toolstring 116 may be individually, directly connected to the downhole telemetry module 110. In one embodiment, the downhole telemetry module 110 may be a separate unit, which is mechanically and electrically connected to the tools in the toolstring 116. In one embodiment, the downhole telemetry module 110 may be integrated into a housing of one of the tools of the toolstring 116.

The downhole telemetry module 110 is operatively coupled to the wireline cable 114. The tools of the toolstring 116, including the downhole telemetry module 110, may be lowered into the wellbore 102 on the wireline cable 114. The wireline cable 114 may be a monocable, coaxial cable, IFC power cable, slickline, or a multi-conductor cable, such as a heptacable.

A surface acquisition module 118 is located at the surface end of the wireline cable 114. The surface acquisition module 118 includes or couples to a telemetry unit 112 (also referred to as a telemetry system). The surface acquisition module 118 may provide control of the components in the toolstring 116 and process and store the data acquired downhole. The surface acquisition module 118 may communicate with the telemetry unit 112 via a bi-directional electrical interface.

The telemetry unit 112 may modulate downlink data (e.g., commands) from the surface acquisition module 118 for transmission via the wireline cable 114 to the toolstring 116, and demodulate uplink data received via the wireline cable 114 from the toolstring 116 for processing and storage by the surface acquisition module 118. The telemetry unit 112 may use a telemetry protocol for uplink and downlink communications with the downhole telemetry module 110. In certain embodiments, the telemetry unit 112 includes a DMT-based transceiver (e.g., DMT-based transmitter and receiver), which is configured to perform DMT modulation of downlink data and DMT demodulation of uplink data.

The downhole telemetry module 110 includes circuitry to module uplink data from the tools of the toolstring 116 for transmission via the wireline cable 114 to the surface acquisition module 118. The downhole telemetry module 110 also includes circuitry to demodulate downlink commands or data from the surface acquisition module 118 for the tools of the toolstring 116. The downhole telemetry module 110 may use a telemetry protocol for uplink and down communications with the telemetry unit 112 of the surface acquisition module 118. The downhole telemetry module 110 may support one or more telemetry protocols for communications with the surface acquisition module 118. In certain embodiments, the downhole telemetry module 110 includes a DMT-based transceiver (e.g., DMT-based transmitter and receiver), which is configured to perform DMT modulation of uplink data and DMT demodulation of downlink data.

Figure 2:
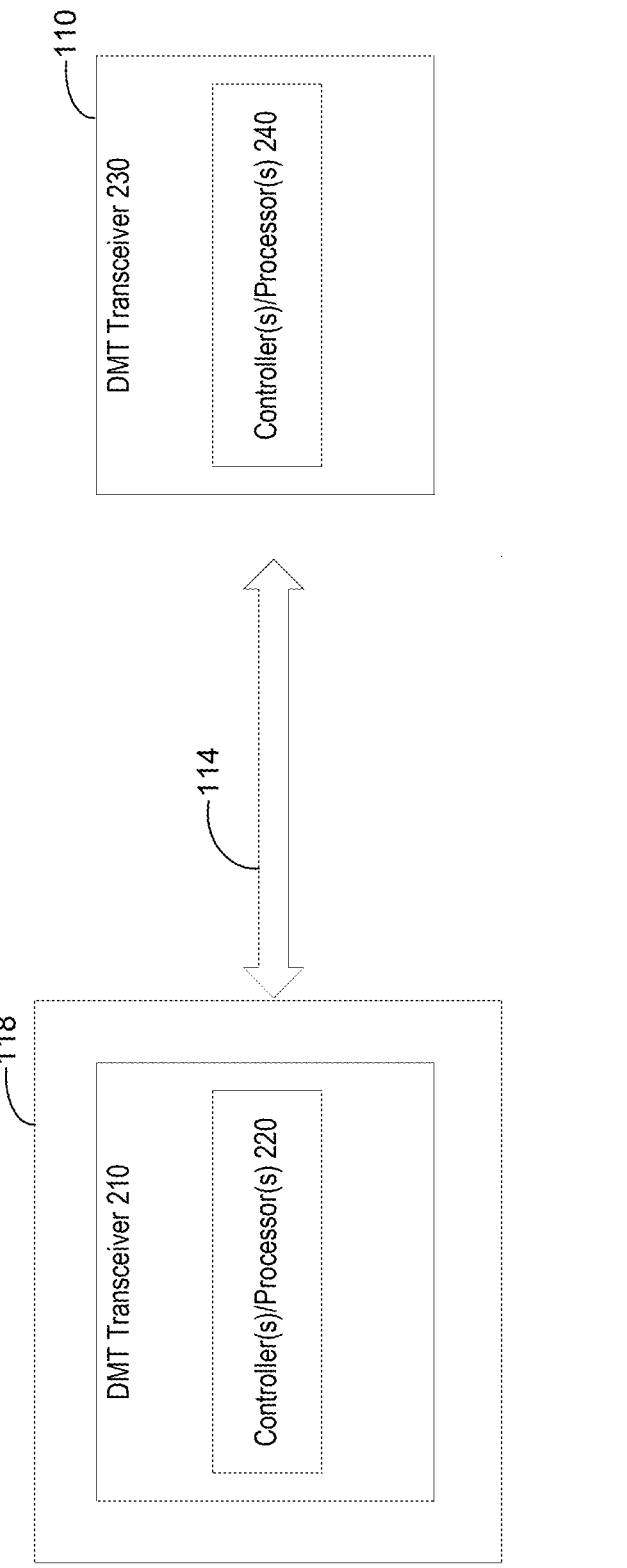
FIG. 2 further illustrates the surface acquisition module and the downhole telemetry module depicted in FIG. 1, according to certain embodiments.

FIG. 2 further illustrates the surface acquisition module 118 and the downhole telemetry module 110 depicted in FIG. 1, according to various embodiments. Generally, surface acquisition module 118 includes a DMT transceiver 210 (also referred to as a DMT modem), which enables transmission of data to the downhole telemetry module 110 (e.g., downlink direction) via wireline cable 114 and reception of data from the downhole telemetry module 110 (e.g., uplink direction) via wireline cable 114. The DMT transceiver 210 includes one or more controller(s)/processor(s) 220, which may be configured to implement various functions described herein related to DMT communications. Although not shown in FIG. 2, the DMT transceiver 210 may include other components, such as modulators, demodulators, encoders, decoders, equalizers, and amplifiers, among others, to enable DMT communication with DMT transceiver 230. Additionally, while FIG. 2 depicts the DMT transceiver 210 within surface acquisition module 118, in certain embodiments, the DMT transceiver 210 may be included within telemetry unit 112.

As also shown, downhole telemetry module 110 includes a DMT transceiver 230 (also referred to as a DMT modem), which enables transmission of data to the surface acquisition module 118 (e.g., uplink direction) via wireline cable 114 and reception of data from the surface acquisition module 118 (e.g., downlink direction) via wireline cable 114. The DMT transceiver 230 includes one or more controller(s)/processor(s) 240, which may be configured to implement various functions described herein related to DMT communications. Although not shown in FIG. 2, the DMT transceiver 230 may include other components, such as modulators, demodulators, encoders, decoders, equalizers, and amplifiers, among others, to enable DMT communication with DMT transceiver 210.

Figure 3:
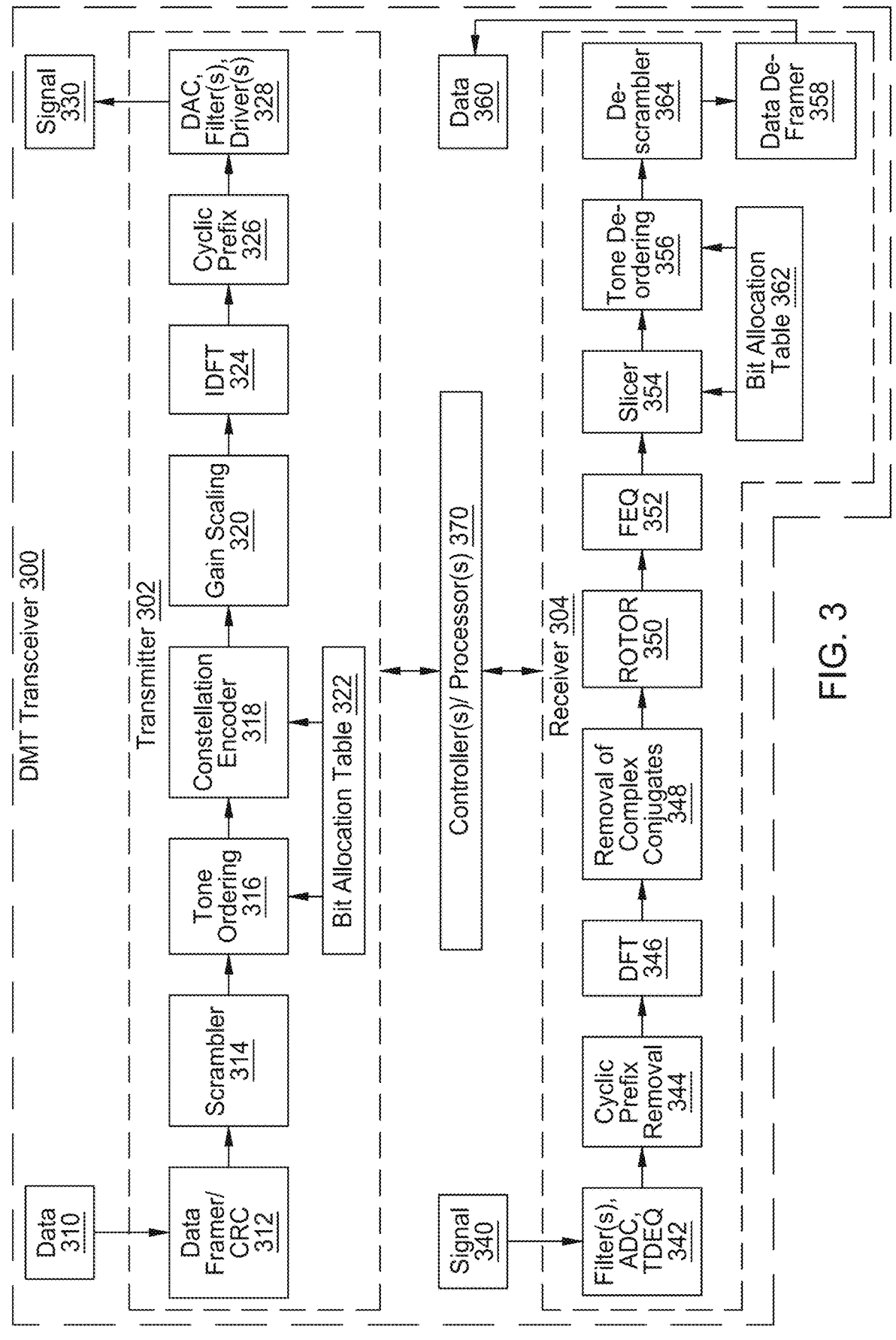
FIG. 3 is a block diagram of a DMT transceiver, according to certain embodiments.

FIG. 3 is a block diagram of a DMT transceiver 300, according to various embodiments. As shown, the DMT transceiver 300 includes a DMT transmitter 302, DMT receiver 304, and controller(s)/processor(s) 370. The controller(s)/processor(s) 370 may control operation of the DMT transmitter 302 (including one or more components thereof), the DMT receiver 304 (including one or more components thereof), or a combination thereof. The DMT transceiver 300 may be representative of the DMT transceiver 210 of FIG. 2 or the DMT transceiver 230 of FIG. 2.

In cases where the DMT transceiver 300 is representative of the DMT transceiver 210, the DMT transmitter 302 may be used to generate and transmit a downlink signal (e.g., signal 330) including data (e.g., data 310) to the downhole telemetry module 110, the DMT receiver 304 may be used to obtain and decode an uplink signal (e.g., signal 340) including data (e.g., data 360) from the downhole telemetry module 110, and the controller(s)/processors(s) 370 may be representative of controller(s)/processor(s) 220 of FIG. 2.

In cases where the DMT transceiver 300 is representative of the DMT transceiver 230, the DMT transmitter 302 may be used to generate and transmit an uplink signal (e.g., signal 330) including data (e.g., data 310) to the surface acquisition module 118, the DMT receiver 304 may be used to obtain and decode a downlink signal (e.g., signal 340) including data (e.g., data 360) from the surface acquisition module 118, and the controller(s)/processors(s) 370 may be representative of controller(s)/processor(s) 240 of FIG. 2.

As shown, the DMT transmitter 302 includes a data framer 312, a scrambler 314, a tone ordering component 316, a constellation encoder 318, a gain scaling component 320, an inverse discrete Fourier transform (IDFT) block 324, a cyclic prefix generator 326, a line interface 328, and a bit allocation table (BAT) 322, each of which may include hardware, software, or combinations thereof. For example, the components of DMT transmitter 302 may be implemented as discrete hardware, as software of a digital processor(s) (e.g., controller(s)/processor(s) 370), or using some other software and/or hardware implementation.

The data framer 312 obtains data 310 (e.g., packet data) from a data source (not shown) and groups bytes of the data 310 together to form data frames. The data frames may be grouped together with a synchronization (SYNC) frame and a cyclic redundancy checksum (CRC) calculated from the contents of the data frames. The CRC provides a means for detecting errors in data received at a receiving end (e.g., DMT receiver 304 of DMT transceiver 210/230).

The scrambler 314 combines the output from the data framer 312 with a pseudo-random mask which randomizes (or scrambles) the data. The tone ordering component 316 splits the scrambled data (e.g., scrambled bitstream) into groups of tones based at least in part on input received from the BAT 322. For example, the tone ordering component 316 may take bits from the scrambled data, and assign the bits to tones (or frequency bins or subcarriers). The number of bits assigned to each tone may be based on the BAT 322, which may indicate, for example, the number of bits that should be allocated to each subcarrier.

The constellation encoder 318 maps the assigned bits from each group of tones to a constellation's complex space in order to generate data symbols. The constellation encoding for each group of tones may be based at least in part on input received from the BAT 322. Here, the constellation encoder 318 may use various digital modulation techniques, such as QPSK and QAM, as illustrative, non-limiting examples. The gain scaling component 320 adjusts the gain of each data symbol. The IDFT block 324 transforms the output from the gain scaling component 320 into a time-domain signal carrying the desired information at each frequency in the form of a DMT symbol.

The cyclic prefix generator 326 adds a cyclic prefix to the beginning of the time-domain signal to generate a modified time-domain signal. The modified time-domain signal is then converted into analog form, filtered, and amplified by the line interface 328 in order to provide a signal 330 for transmission across the wireline cable 114.

As also shown, the DMT receiver 304 includes a line interface 342, a cyclic prefix remover 344, a discrete Fourier transform (DFT) block 346, a complex conjugate removal block 348, a rotor 350, a frequency-domain equalizer (FEQ) 352, a slicer 354, a time deordering component 356, a data deframer 358, a descrambler 364, and a BAT 362, each of which may include hardware, software, or combinations thereof. For example, the components of DMT transmitter 302 may be implemented as discrete hardware, as software of a digital processor(s) (e.g., controller(s)/processor(s) 370), or using some other software and/or hardware implementation.

The line interface 342 receives a time-domain signal 340. The line interface 342 filters the received signal 340, converts the signal 340 into digital form, and performs time domain equalization (TDEQ) (e.g., using a finite impulse response (FIR) filter) on the signal 340. The cyclic prefix remover 344 removes the cyclic prefixes that may have been added by the cyclic prefix block 326 of a DMT transmitter. In some cases, the cyclic prefix remover 344 may also convert the serial data output from the line interface 342 into a parallel data output.

The DFT block 346 transforms the time-domain signal into a frequency-domain signal. The complex conjugate removal block 348 removes complex conjugates from the frequency-domain signal. The rotor 350 rotates samples of the frequency-domain signal in proportion to respective tone indexes of the samples in order to correct for bias in sampling time. The FEQ 352 performs frequency domain equalization on the rotated samples of the frequency-domain signal, e.g., to compensate for intersymbol interference. The slicer 354 decodes complex numbers of the equalization output into bit groups, based at least in part on input from the BAT 362. The BAT 362, for example, may indicate, for example, the number of bits that are allocated to each carrier. In certain cases, BAT 362 may be similar to BAT 322.

The tone deordering component 356 combines the bit groups into a bitstream based at least in part on input from the BAT 362. The descrambler 364 combines the data from the bitstream with the pseudo-random mask to return the data to its unscrambled form. The data de-framer 358 identifies and removes synchronization information, and determines if the CRC indicates the presence of any errors. If error free, the data 360 is forwarded, e.g., to a data sink (not shown) accessible to the controller(s)/processor(s) 370. Otherwise, the controller(s)/processor(s) 370 is notified of errors in the data 360.

Note that the DMT transceiver 300 depicted in FIG. 3 is an illustrative example implementation of a DMT transceiver and that other DMT transceiver configurations are contemplated.

Figure 4:
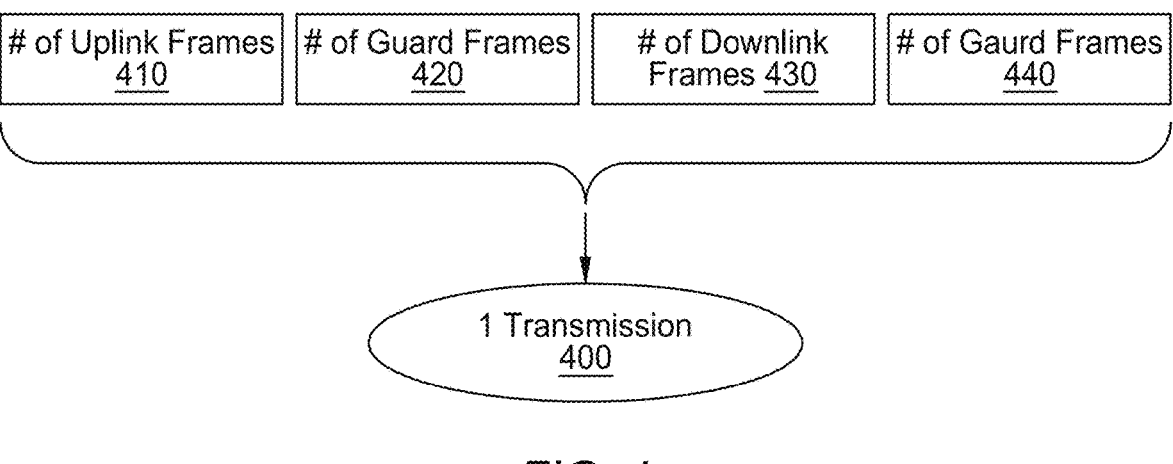
FIG. 4 depicts an example transmission frame, according to certain embodiments.

As noted, the surface acquisition module 118 and the downhole telemetry module 110 may establish a telemetry session (e.g., communication session) in order to communicate with each other via the wireline cable 114. A telemetry session may include two main phases: (i) a single training phase at power up or link down and (ii) a data transmission phase generally referred to as "showtime." Each transmission frame within a telemetry session may include a complete uplink-guard-downlink-guard cycle. By way of example, FIG. 4 depicts an example transmission frame 400 that includes a number of uplink frames 410, a number of guard frames 420, a number of downlink frames 430, and another number of guard frames 440.

The phases of a telemetry session may involve one or more states, where each state is designed to perform a particular task. In some cases, a state machine may be used to govern surface and downhole operations for both uplink and downlink communications. In some cases, however, at the surface, the uplink receiver and downlink transmitter may not be processing the same frame at the same time due to transmission and buffering delays. In such cases, a separate state machine may be used for each transmitter (e.g., DMT transmitter 302) and receiver (e.g., DMT receiver 304). Each state machine may be implemented by a controller(s)/processor(s) (e.g., controller(s)/processor(s) 370).

Figure 5:
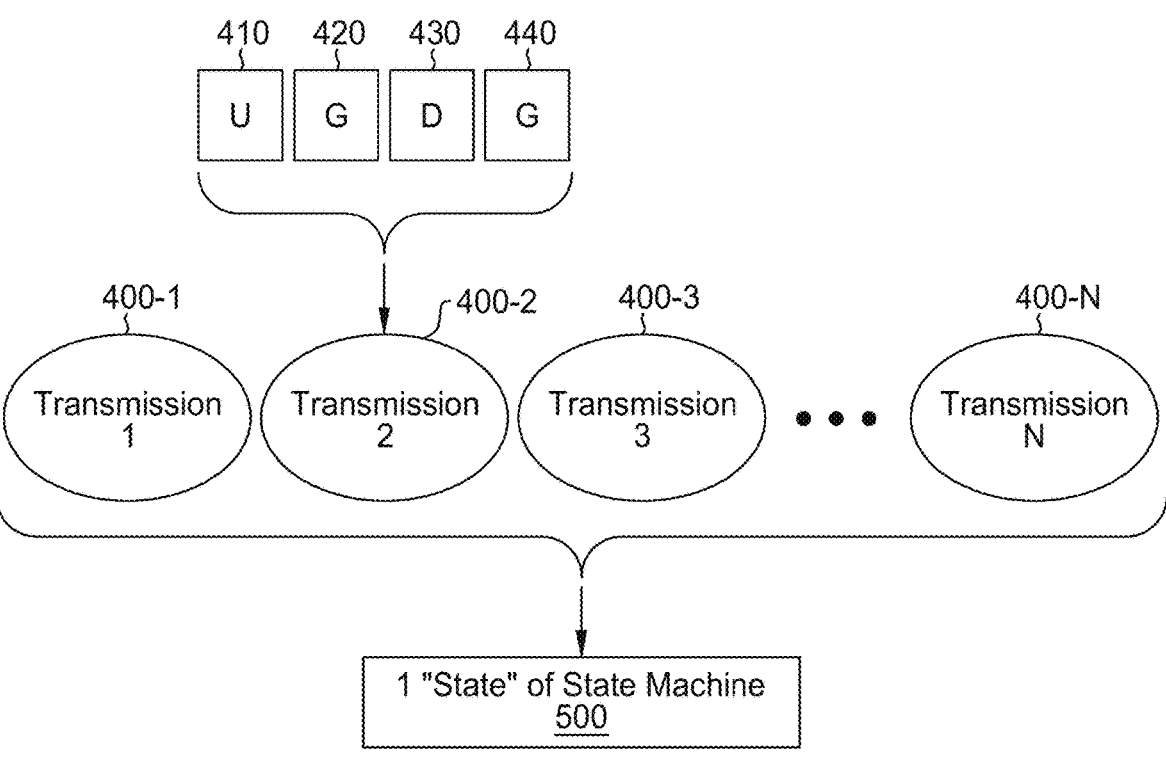
FIG. 5 depicts an example state of a state machine for DMT communication, according to certain embodiments.

A particular state of a given state machine (e.g., for a transmitter or receiver) may involve multiple transmissions. By way of example, FIG. 5 depicts a scenario in which a given state of a state machine 500 involves transmissions 400-1 to 400-N, each including uplink frames 410, guard frames 420, downlink frames 430, and guard frames 440. Each state in a state machine 500 may include (or otherwise be indicative of) multiple attributes, such as the state name/ identifier, total number of transmissions (e.g., uplink+ guard+downlink+guard) included within the state, total number of uplink frames in each transmission, total number of downlink frames in each transmission, current frame type (e.g., uplink, uplink-guard, downlink, or downlink-guard), current transmission index, current frame index, total number of frames in current frame type, or any combination thereof.

Figure 6:
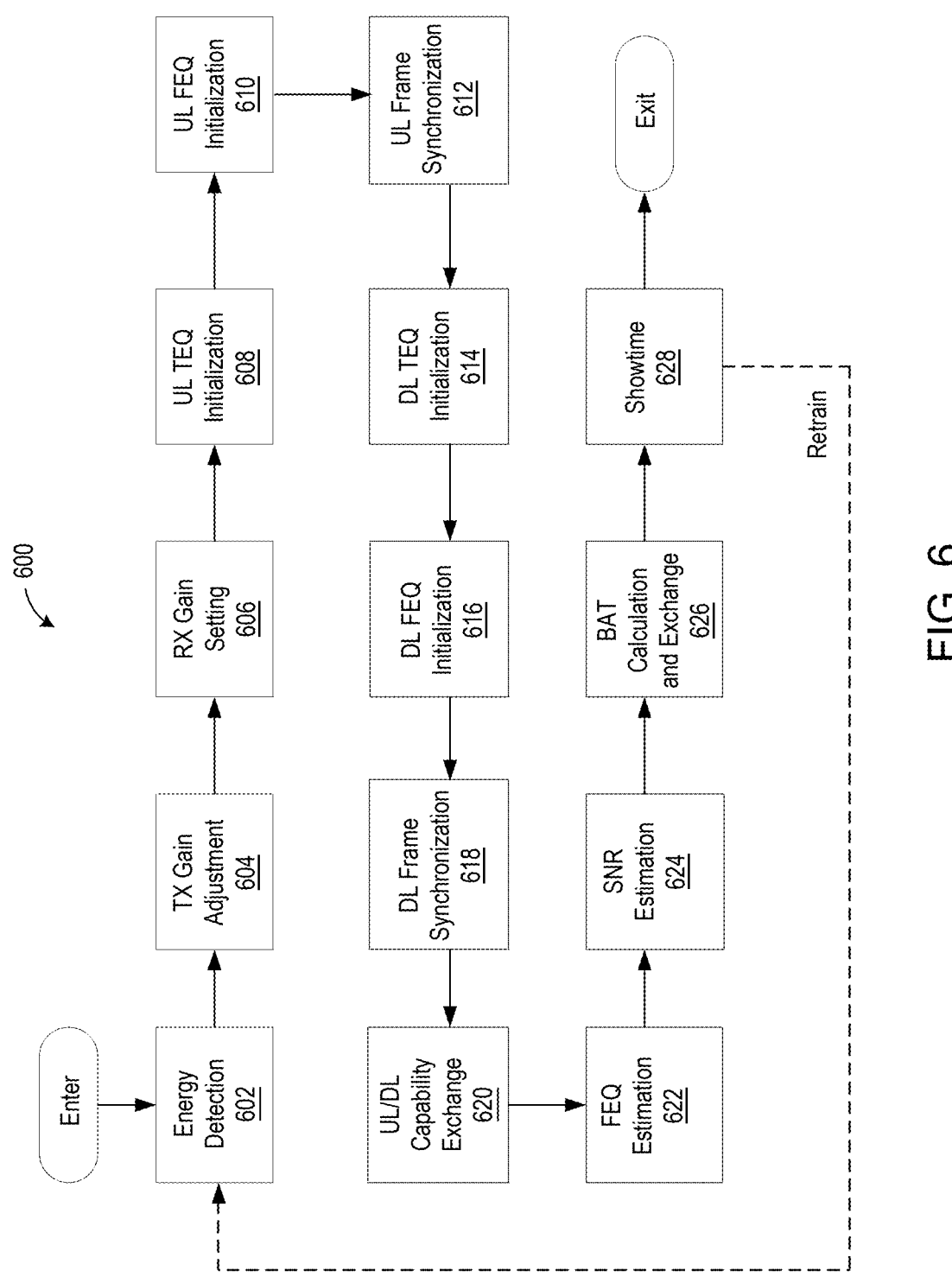
FIG. 6 is a block diagram of an example training phase, according to certain embodiments.

The surface acquisition module 118 and the downhole telemetry module 110 may start up from the training phase. During the training phase, the DMT transceivers 210 and 230 may both be trained according to the channel conditions which allows the estimation of the data carrying capabilities of the wireline cable 114. FIG. 6 is a block diagram of an example training phase 600 including one or more sequential states 602-630, according to various embodiments. The training phase 600 may be performed by the DMT transceiver 210 of surface acquisition module 118 and the DMT transceiver 230 of downhole telemetry module 110.

As shown, the training phase 600 may involve an energy detection state 602, a transmitter (TX) gain adjustment state 604, a receiver (RX) gain setting state 606, an uplink (UL) time-domain equalization (TEQ) initialization state 608, an UL FEQ initialization state 610, an UL frame synchronization state 612, a DL TEQ initiation state 614, a DL FEQ initialization state 616, a DL frame synchronization state 618, an uplink/downlink (UL/DL) capability exchange state 620, a FEQ estimation state 622, a signal-to-noise ratio (SNR) estimation state 624, a BAT calculation and exchange state 626, and a showtime state 628. Each state 602-628 may involve a number of transmissions, e.g., as depicted in FIG. 5.

The energy detection state 602 may involve the surface acquisition module 118 performing UL energy detection, and the downhole telemetry module 110 performing DL energy detection. The UL energy detection may be based on a pilot tone(s) transmitted by the downhole telemetry module 110, and the DL energy detection may be based on message(s) from the surface acquisition module 118 indicating parameters such as a telemetry mode and UL TX gain adjustment, among others. During the energy detection state 602, the downhole telemetry module 110 may also confirm the telemetry mode and request a DL TX gain adjustment (e.g., based on the DL energy detection).

The TX gain adjustment state 604 may involve the downhole telemetry module 110 measuring a REVERB signal transmitted from the surface acquisition module 118, and sending a DL TX gain fine adjustment request to the surface acquisition module 118 based on the measurement. Similarly, the surface acquisition module 118 may measure a REVERB signal transmitted from the downhole telemetry module 110 and send a UL TX gain fine adjustment request to the downhole telemetry module 110 based on the measurement. In certain embodiments described in greater detail herein, the TX gain adjustment state 604 may also involve an automatic bandwidth selection for the telemetry session, based on training tones transmitted from the downhole telemetry module 110.

The RX gain setting state 606 may involve the surface acquisition module 118 performing UL RX gain selection based on pilot and REVERB signals transmitted from the downhole telemetry module 110, and the downhole telemetry module 110 performing DL RX gain selection based on REVERB signals transmitted from the surface acquisition module 118.

The UL TEQ initialization state 608 may involve the surface acquisition module 118 performing an UL fine tune of sampling time, UL TEQ, and UL synchronization with a pilot signal transmitted from the downhole telemetry module 110. The UL FEQ initialization state 610 may involve the surface acquisition module 118 performing UL FEQ based on pilot and REVERB signals transmitted from the downhole telemetry module 110. The UL frame synchronization state 612 may involve the surface acquisition module 118 performing UL frame synchronization based on REVERB and SEGUE signals transmitted from the downhole telemetry module 110.

The DL TEQ initialization state 614 may involve the downhole telemetry module 110 performing DL TEQ based on a REVERB signal transmitted from the surface acquisition module 118. The DL FEQ initialization state 616 may involve the downhole telemetry module 110 performing DL FEQ based on a REVERB signal transmitted from the surface acquisition module 118. The DL frame synchronization state 618 may involve the downhole telemetry module 110 performing DL frame synchronization based on REVERB and SEGUE signals transmitted from the surface acquisition module 118.

The UL/DL capability exchange state 620 may involve the downhole telemetry module 110 and the surface acquisition module 118 exchanging indications of respective capabilities for the telemetry session. The FEQ estimation state 622 may involve the surface acquisition module 118 performing UL FEQ and the downhole telemetry module 110 performing DL FEQ. The SNR estimation state 624 may involve the surface acquisition module 118 performing UL SNR estimation based on pilot and medley signals transmitted from the downhole telemetry module 110, and the downhole telemetry module 110 performing DL SNR estimation based on medley signals transmitted from the surface acquisition module 118.

The BAT calculation and exchange state 626 may involve the surface acquisition module 118 calculating and exchanging an UL BAT with the downhole telemetry module 110, and the downhole telemetry module 110 calculating and exchanging a DL BAT with the surface acquisition module 118. The showtime state 628 may involve data exchange between the surface acquisition module 118 and the downhole telemetry module 110. In some cases, the training phase 600 may involve retraining (e.g., proceed to state 602 from state 628) based on operations performed in one or more of the states 602-628.

Example Automatic Bandwidth Selection

Conventional DMT systems, such as those found in asymmetric digital subscriber line (ADSL) communications, generally assume a channel bandwidth of 1.104 megahertz (MHz). However, certain cables used in the oil and gas industry may have a very narrow bandwidth, e.g., significantly smaller than the assumed channel bandwidth. For example, depending on the length of the cable (e.g., wireline cable 114), the usable bandwidth may be as small as 60 kilohertz (kHz). In addition to a narrow operating bandwidth, conventional DMT systems may be impacted by other challenges, such as large attenuation, large cable resistance, large electrical noise produced by operation of downhole tools, and lack of support for long cable lengths, among others.

Figure 7:
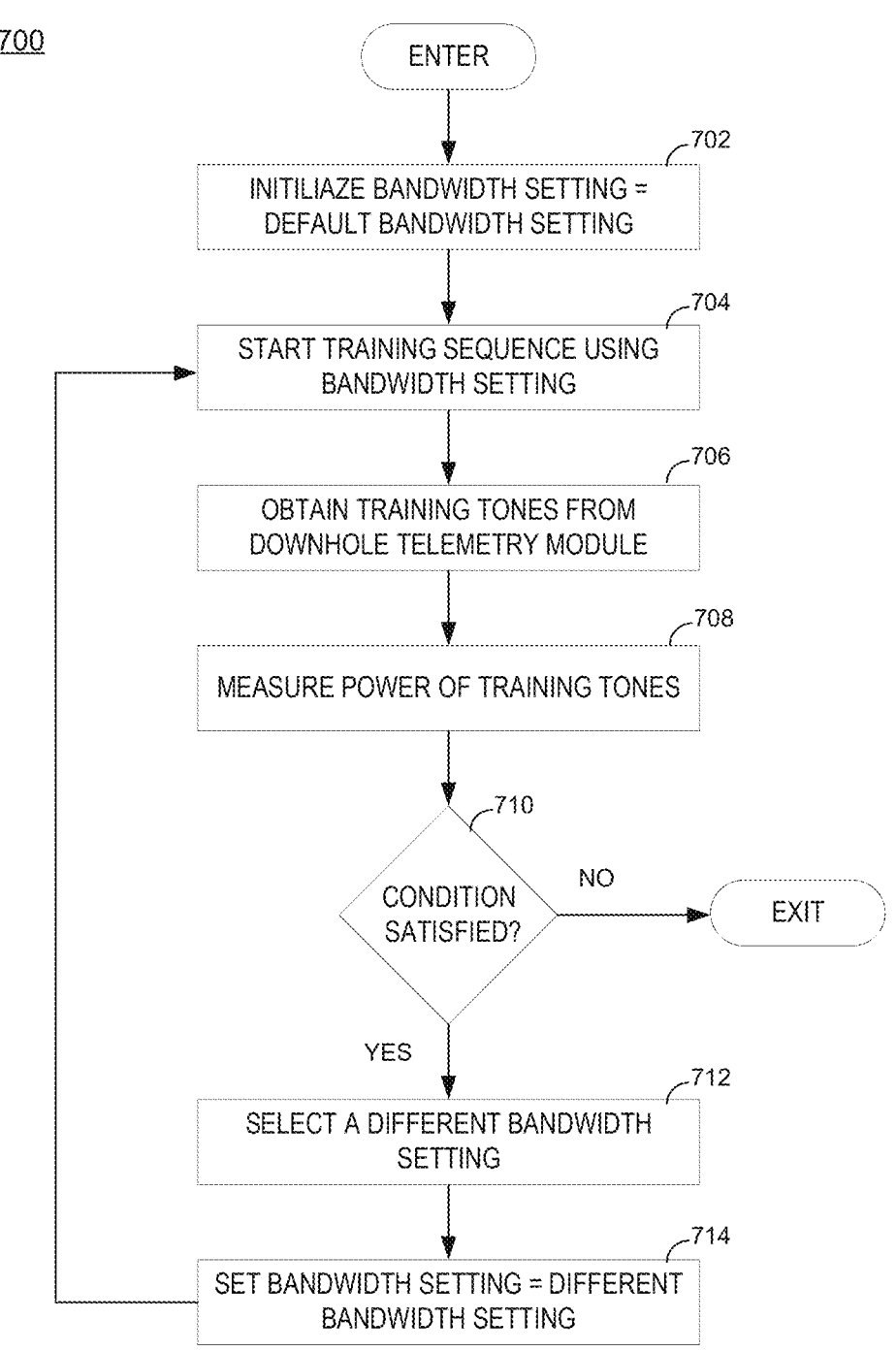
FIG. 7 is a flowchart of an example method for performing automatic bandwidth selection for a telemetry session, according to certain embodiments.

The present disclosure provides techniques for automatically selecting an operating bandwidth from multiple available operating bandwidths for a telemetry session, based on cable conditions. By way of example, FIG. 7 is a flowchart of an example method 700 for performing automatic bandwidth selection for a telemetry session, according to various embodiments.

Method 700 may enter at block 702, where the surface acquisition module (e.g., surface acquisition module 118) and downhole telemetry module (e.g., downhole telemetry module 110) initialize a bandwidth setting for a telemetry session to a default bandwidth setting (e.g., 125 kHz bandwidth (250 kHz sampling rate) mode).

At block 702, the surface acquisition module and downhole telemetry module start the training sequence (e.g., training sequence 600) using the default bandwidth setting.

At block 704, the surface acquisition module obtains a set of training tones from the downhole telemetry module. In an illustrative example, the downhole telemetry module may transmit energy at tone 32 (15.625 kHz) and at tone 128 (62.5 kHz) in order to estimate the channel attenuation slope. In some cases, the operations in block 704 may be performed during the TX gain adjustment state 604.

At block 706, the surface acquisition module measures the power of each of the set of training tones. For example, assuming the downhole telemetry module transmits energy at tone 32 and at tone 128, the surface acquisition module measures the power at tone 32 and the power at tone 128.

At block 708, the surface acquisition module determines whether the power measurements satisfy a predetermined condition. In certain embodiments, the predetermined condition may include a difference between the power of a first training tone within the set of training tones and the power of a second training tone within the set of training tones being greater than (or equal to) a threshold. Continuing with the aforementioned example, if the power at tone 128 is larger than a threshold of the power at tone 32, then the channel attenuation slope may be classified as low, and thereby classified as able to support a bandwidth setting (e.g., 250 kHz bandwidth (500 kHz sampling rate)) that is higher than the default bandwidth setting. If the predetermined condition is satisfied, then the method 700 proceeds to block 712.

At block 712, the surface acquisition module and the downhole telemetry module select a different bandwidth setting (e.g., 250 kHz bandwidth) that is higher than the default bandwidth setting. At block 714, the surface acquisition module and the downhole telemetry module set the bandwidth setting to the default bandwidth setting, and restart the training sequence with the updated bandwidth setting (block 704).

Note while FIG. 7 depicts a method for automatic bandwidth selection for a telemetry session, in certain embodiments, the techniques described herein may allow a user to select a bandwidth setting (among multiple available bandwidth settings) for the telemetry session. For example, the user may select the default bandwidth setting or a higher bandwidth setting via a graphical user interface (GUI) used for configuring the telemetry session. In certain embodiments, such a GUI may also enable the user to select the automatic bandwidth selection (e.g., method 700).

Example Frequency Band Limit

As noted, some challenges associated with conventional DMT systems for single-mode telemetry applications, such as cased-hole telemetry for production services, may include high channel attenuation, low channel bandwidth, and large electrical noise produced by the operation of downhole tools, as illustrative examples.

To address this, the present disclosure provides techniques for modifying the automatic bandwidth selection described herein in order to increase the SNR of the channel. For example, in the automatic bandwidth selection stage, the sampling rate is set, which determines the maximum bandwidth possible for the telemetry session. However, the effective bandwidth of the DMT signal can be determined by the number of active subcarriers. Thus, fitting the transmission to the appropriate bandwidth can increase the power spectral density of the received signal, thereby providing an increase in SNR.

In certain embodiments described herein, the DMT transmitter (e.g., DMT transmitter 302) is configured to measure the channel frequency response during the training stage (e.g., training sequence 600) and adapt the transmitted power to the usable bandwidth of the channel, based on the channel frequency response. In this manner, the DMT transmitter can increase the reliability and data rate of the communication during the telemetry session. Note that while certain embodiments describe adapting the transmitted power to the usable bandwidth of the channel on the downlink (e.g., transmission from surface acquisition module 118 to downhole telemetry module 110), such techniques for adapting the transmitted power to the usable bandwidth of the channel may also be applied on the uplink (e.g., transmission from downhole telemetry module 110 to surface acquisition module 118).

Figure 8:
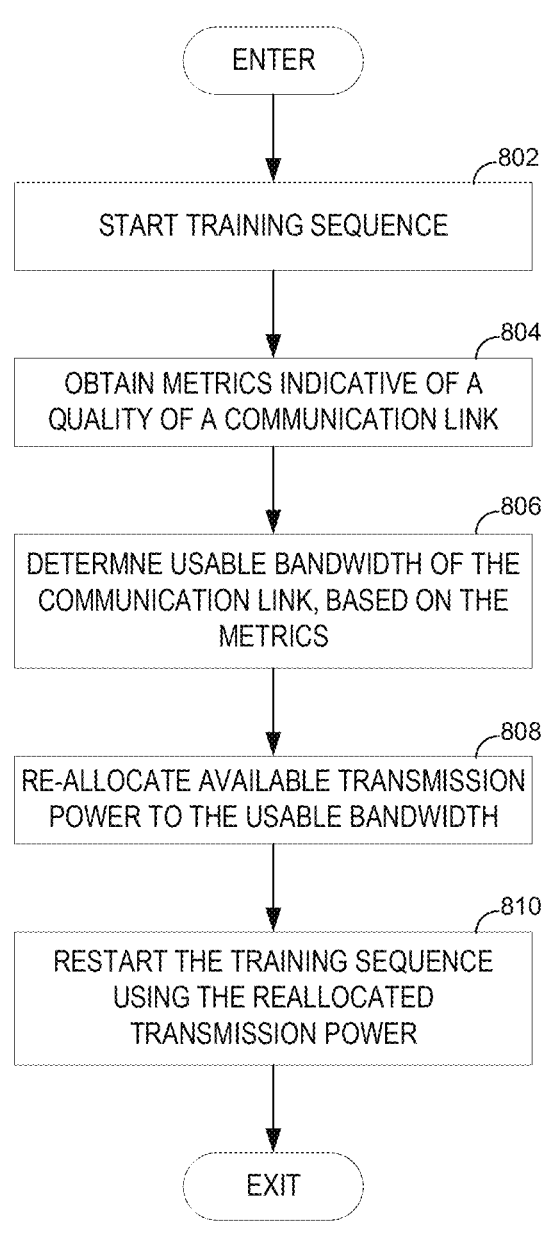
FIG. 8 is a flowchart of an example method for adapting transmitted power to a usable channel bandwidth, according to certain embodiments.

FIG. 8 is a flowchart of an example method 800 for adapting transmitted power to a usable channel bandwidth, according to various embodiments. The method 800 may be performed by a DMT transmitter (e.g., DMT transmitter 302), such as transmitter of surface acquisition module 118 (e.g., for downlink direction) or transmitter of downhole telemetry module 110 (e.g., for uplink direction).

Method 800 may enter at block 802, where the DMT transmitter starts a training sequence (e.g., training sequence 600). At block 804, the DMT transmitter obtains one or more metrics indicative of a quality of a communication link (e.g., wireline cable 114) between the DMT transmitter and a DMT receiver (e.g., DMT receiver 304 of another DMT transceiver).

At block 806, the DMT transmitter determines a usable bandwidth of the communication link, based on the one or more metrics. The one or more metrics may include a frequency response of the communication link, an SNR of the communication link, or a combination thereof.

The usable bandwidth may define a number of subcarriers (or carrier tones) to be used for transmission. In certain embodiments, the determination of the usable bandwidth (at block 806) may involve choosing a set of subcarriers that can provide a minimum level of quality in terms of the one or more metrics, grouping the subcarriers in a single frequency band, and designating the single frequency band as the usable bandwidth. In some cases, the usable bandwidth can include tones to which zero bits have been allocated initially as reserved for later bit-swapping candidates. Subcarriers outside of the usable bandwidth may have zero energy allocated. Note, for effective measurement of the one or more metrics (e.g., SNR) during showtime, the unused tones in the usable bandwidth may be used to transmit data of a known sequence (e.g., MEDLEY sequence). The receiver may calculate the metric(s) as slicing error from the known data sequence.

At block 808, the DMT transmitter re-allocates available transmission power to the usable bandwidth. For example, with the usable bandwidth estimated, the DMT transmitter may calculate the maximum number of subcarriers to be used during showtime. In an illustrative example, with the number of usable carriers defined as N and the total number of all possible subcarriers defined as NCARRIERS (where N<NCARRIERS), the TX power can be boosted by a factor of (NCARRIERS/N). In terms of amplitude, the multiplying factor may be represented as sqrt (NCARRIERS/N), where sqrt is the square root operation. In certain embodiments, the usable bandwidth (N) may be independently estimated to uplink usable bandwidth (N_UL) and downlink usable bandwidth (N_DL), as the electronics and noise environments for uplink and downlink may be different.

Figures 9A, 9B:
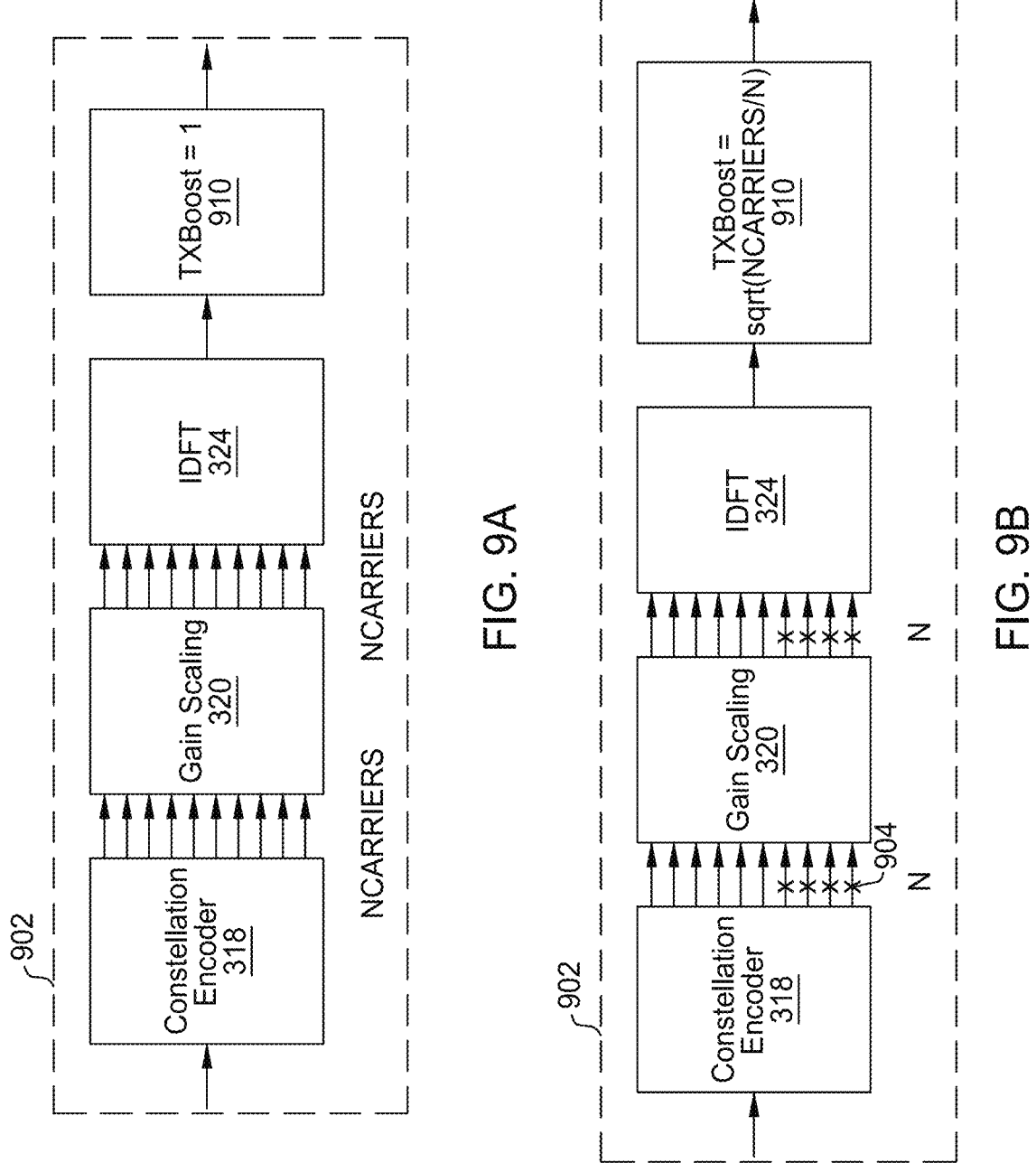
FIG. 9A is a schematic representation of at least a portion of a DMT transmitter prior to adapting transmitted power to a usable channel bandwidth, according to certain embodiments.
FIG. 9B is a schematic representation of at least a portion of a DMT transmitter after adapting transmitter power to a usable channel bandwidth, according to certain embodiments.

As an illustrative example, consider FIGS. 9A and 9B illustrating at least a portion of a DMT transmitter 902, according to various embodiments. Compared to the DMT transmitter 302 illustrated in FIG. 3, the DMT transmitter 902 includes a TX power boost block 910, which may be implemented in hardware, software, or combinations thereof. FIG. 9A is a schematic diagram showing at least a portion of the DMT transmitter 902 during training before a TX boost is applied, and FIG. 9B is a schematic diagram showing at least a portion of the DMT transmitter 902 during training after a TX boost is applied.

In FIG. 9A, the total number of subcarriers is NCARRI-ERS and the TX power boost factor's initial value is 1.0. As shown in FIG. 9B, after determining the usable bandwidth and reallocating the TX power to the usable bandwidth, there are N remaining active subcarriers and the TX power boost's factor value is set to sqrt (NCARRIERS/N). In certain embodiments, the N active subcarriers may be deter-mined by turning off low SNR subcarriers 904 and reallo-cating the power from the low SNR subcarriers 904 to the N active subcarriers.

Referring back to FIG. 8, at block 810, the DMT trans-mitter restarts (or repeats) the training sequence using the reallocated transmission power. For example, after the TX power boost factor is determined from the estimated usable bandwidth, one or more training parameters may have to be retrained (e.g., due to presence of non-linearity in TX components, such as a power amplifier). Retraining with the TX boost factor may involve using REVERB/MEDLEY/ SURGE sequences within the estimated usable bandwidth, since tones outside the usable bandwidth may have zero amplitude. When restarting the training sequence, the DMT transmitter may perform all or a subset of the previous training sequence with the TX boost factor.

Figure 10:
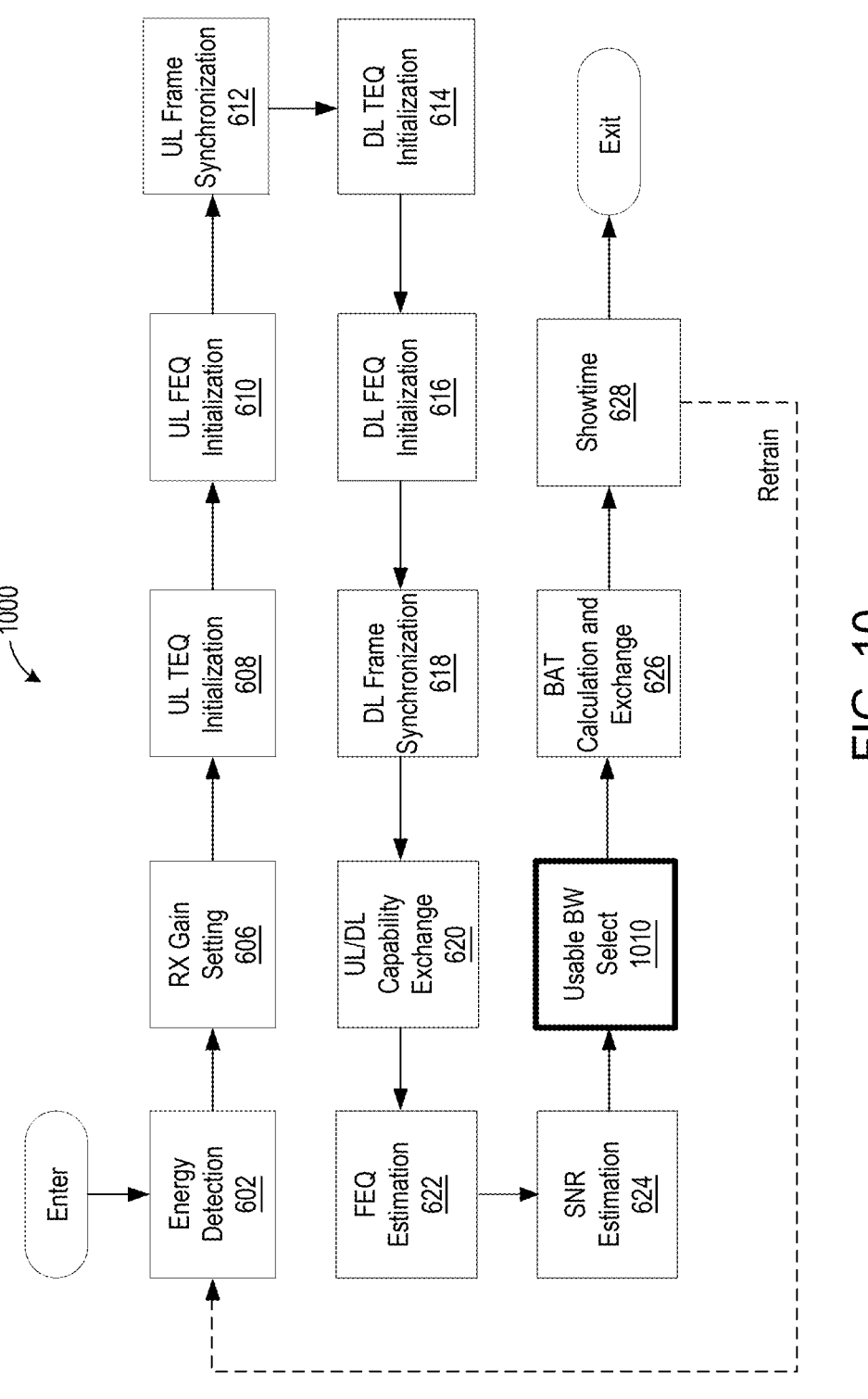
FIG. 10 is a block diagram of an example training phase, according to certain embodiments.

In certain embodiments, the DMT transmitter may repeat the training sequence from the beginning, except the initial steps to determine TX gain. By way of example, consider FIG. 10 which is a block diagram of an example training phase 1000, according to various embodiments. The training phase 1000 may be performed by DMT transmitter 902 of surface acquisition module 118 and/or DMT transmitter 902 of downhole telemetry module 110.

Compared to the training phase 600, the training phase 1000 lacks a TX gain adjustment state 604 and includes a usable bandwidth (BW) select state 1010. In certain embodi-ments, when the usable BW select state 1010 is executed for the first time (e.g., after modem reset), the usable BW select state 1010 calculates the usable bandwidth (N). In certain embodiments, the usable BW select state 1010 may detect the usable bandwidth as the highest subcarrier that satisfies a predefined SNR criterion. The maintenance data to exchange may be the number of subcarriers determined as usable. The usable BW select state 1010 may calculate the downlink usable bandwidth (N_DL) and the uplink usable bandwidth (N_UL) independently. Then, the RX gain may be initialized to its default value and the training phase 1000 may go back to the RX gain setting state when re-training with the TX boost factor applied. Note, when the usable BW select state is executed for a second time, the usable BW select state may not perform an operation, and the training phase 1000 may proceed to the next state (e.g., BAT calculation and exchange state 626).

Figure 11:
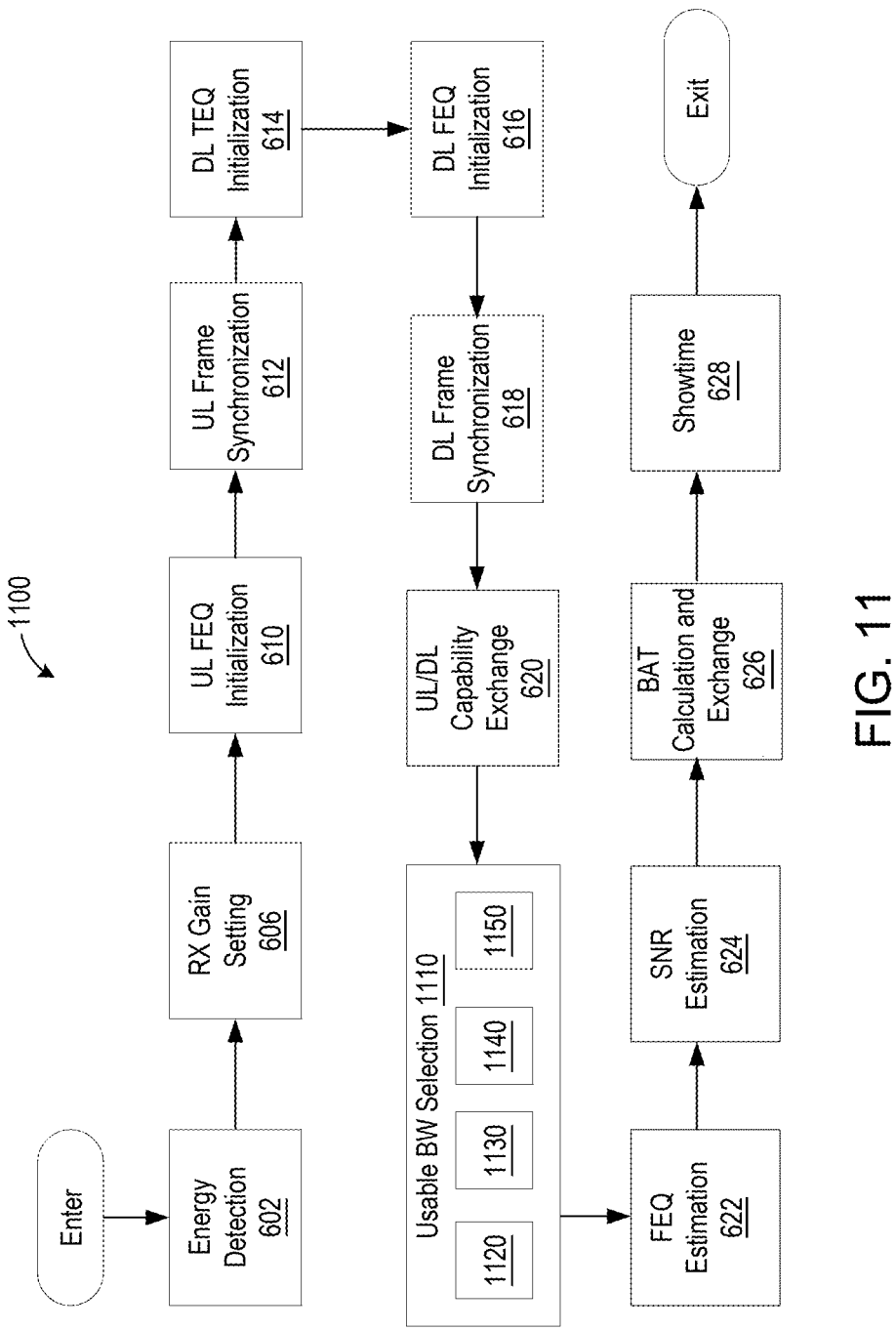
FIG. 11 which is a block diagram of another example training phase, according to certain embodiments.

In certain embodiments, the DMT transmitter may repeat the training sequence (i) without repeating the TX gain adjustment state 604 and the UL TEQ initialization state 608 and (ii) with new states for estimating the usable bandwidth and TX power boost factor and for reinitializing the RX gain to be used with TX power boosting. By way of example, consider FIG. 11 which is a block diagram of an example training phase 1100, according to various embodiments. The training phase 1100 may be performed by DMT transmitter 902 of surface acquisition module 118 and/or DMT trans-mitter 902 of downhole telemetry module 110.

Compared to the training phase 600, the training phase 1100 lacks a TX gain adjustment state 604 (during retrain-ing), lacks an UL TEQ initialization state 608 (during retraining), and includes a usable BW selection (UBS) state 1110 prior to the FEQ estimation estate 622. The UBS state 1110 is configured to optimize (or at least increase) the TX power boost factor and bandwidth to use before the FEQ estimation state 622. As shown, the UBS state 1110 includes four sub-states: a UBS equalization state 1120, a UBS SNR estimation state 1130, a UBS result exchange state 1140, and a UBS RX gain readjustment state 1150.

The UBS equalization state 1120 is configured to estimate the temporary FEQ for a full bandwidth (NCARRIERS). The UBS equalization state 1120 may output a set of FEQ coefficients and provide the FEQ coefficients to the UBS SNR estimation state 1130.

The UBS SNR estimation state 1130 may be similar to the SNR estimation state 624. For example, the UBS SNR estimation state may measure slicing errors using a MED-LEY sequence for SNR estimation.

The UBS result exchange state 1140 may determine N_UL and N_DL and exchange the information between the downhole telemetry module 110 and surface acquisition module 118.

The UBS RX gain readjustment state 1150 may apply a TX boost factor and readjust the RX gain. For example, the RX gain (selection of hardware gain step) may have to be re-adjusted when the TX power boost factor is applied. Here, the RX gain may be initialized to an initial setting. Then, the REVERB sequence may be used to detect the adequate RX gain for both uplink and downlink. The highest RX gain before reaching saturation may then be selected.

Example Fast Bit Swapping

Certain DMT systems may perform bit swapping to circumvent localized noise bands in DMT communications. For example, as noted, conventional DMT systems used in many single-mode telemetry applications may be subject to large amounts of noise in the downhole reception. Legacy bit swapping technologies rely on the exchange of mainte-nance data to update the BAT that describes the allocation of bits to the individual subcarriers that form the DMT signal. However, under very noisy conditions, the communication in the direction of the receiver affected by such noise might prevent such maintenance data to arrive error free to the receiver.

To address this, the present disclosure provides tech-niques for performing a fast bit swapping operation. In certain embodiments, the fast bit swapping operation may involve dynamically allocating active subcarriers for a trans-mission, based on a measured SNR ratio. The fast bit swapping operation described herein may enable a DMT system to eliminate the assumption of an error-free receiver and provide a means for the BAT update to be performed under noisy conditions. Note that while certain embodiments describe performing a fast bit swapping operation on the downlink (e.g., transmission from surface acquisition module 118 to downhole telemetry module 110), such techniques for performing the fast bit swapping operation may also be applied on the uplink (e.g., transmission from downhole telemetry module 110 to surface acquisition module 118).

Figure 12:
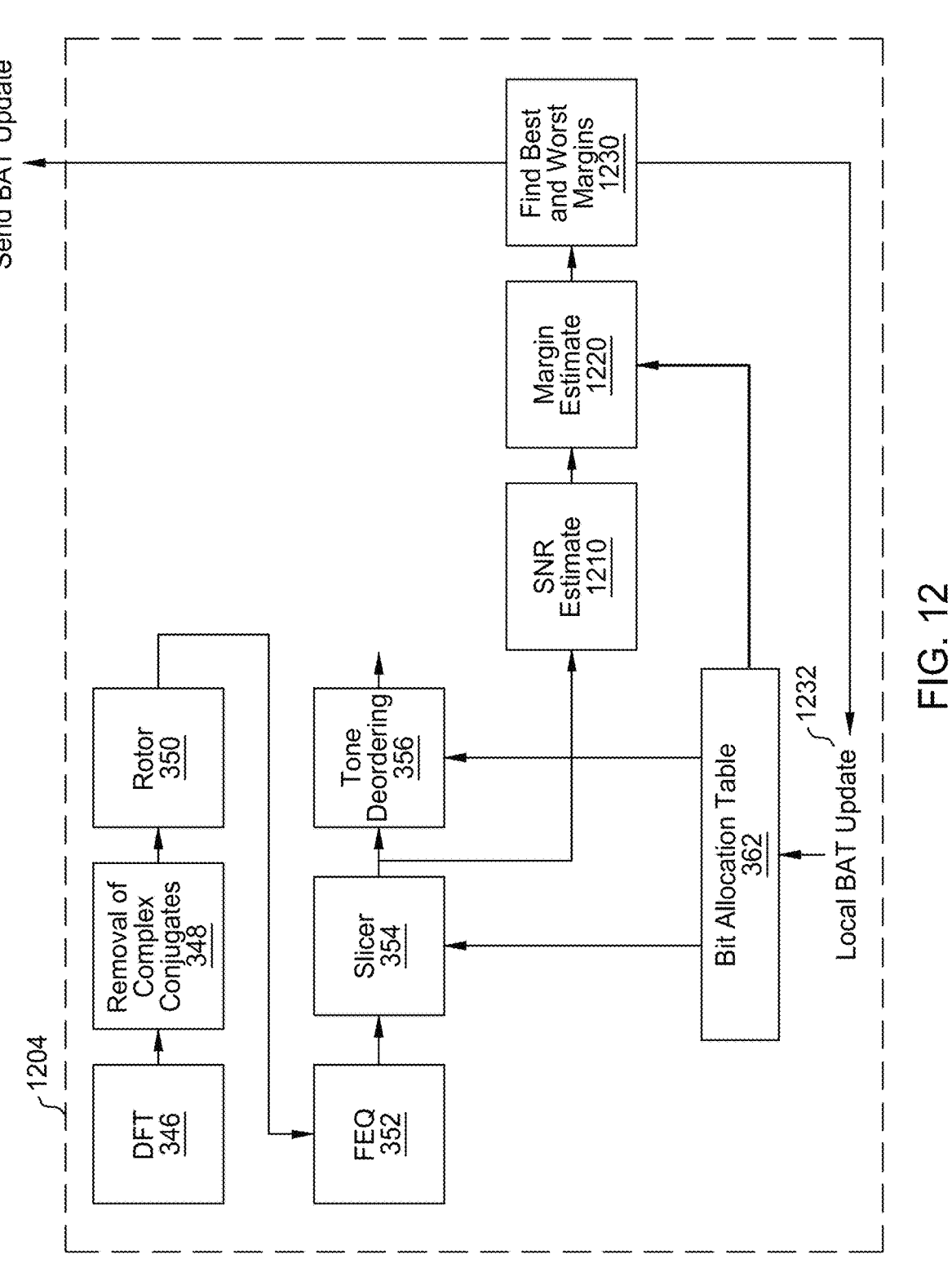
FIG. 12 illustrates at least a portion of a DMT receiver, according to certain embodiments.

In certain embodiments, the fast bit swapping operation may involve transferring bit allocations from a set of low SNR subcarriers to a set of high SNR subcarriers. As used herein, the term "SNR margin" may be used to convey the concept of a number of decibels (dB) of SNR above a minimum operating SNR. Consider FIG. 12 illustrating at least a portion of a DMT receiver 1204, according to various embodiments. Compared to the DMT receiver 304 illustrated in FIG. 3, the DMT receiver 1204 includes an SNR estimation block 1210, an SNR margin estimation block 1220, and a bit swapping candidate identification block 1230, each of which may be implemented in hardware, software, or combinations thereof.

In certain embodiments, the SNR estimation block 1210 is configured to (continuously) measure the downlink SNR of subcarriers (or tones) during a data exchange between the surface acquisition module 118 and downhole telemetry module 110 (e.g., during showtime). For example, in certain cases, the downlink SNR of usable subcarriers can dynamically change during the client data exchange (e.g., showtime). In such cases, any subcarriers in the usable bandwidth can have bits allocated when the SNR of those tones are high. On the other hand, any subcarriers with low SNR can be set to unused subcarriers, which are subcarriers transmitting "dummy" information to keep the channel estimates and SNR estimates updated. To enable continuous measurement of the downlink SNR of subcarriers, unused subcarriers may use energy to send "dummy" data. Given the "dummy" data may use a known sequence (e.g., known pseudo random sequence), the DMT receiver 1204 can calculate the slicing error against the known expected constellation as a source of the DL SNR estimation.

In certain embodiments, the SNR margin estimation block 1220 may determine, for each subcarrier within the usable bandwidth, a respective SNR margin for the subcarrier (e.g., relative to a minimum operating SNR). The SNR margin estimation block 1220 may determine which subcarriers are within the usable bandwidth, based on the BAT 362.

In certain embodiments, the bit swapping candidate identification block 1230 is configured to determine one or more bit swapping candidates based on the SNR margins output from the SNR margin estimation block 1220. The bit swapping candidate identification block 1230 may include bit swapping logic for reviewing, eliminating, and/or moving data (e.g., bits) from subcarriers. For example, the bit swapping logic allows for selecting subcarriers to use, and the number of bits for those used subcarriers, to maximize (or at least increase) the worst SNR margin. In certain cases, the bit swapping logic may assume that (i) the total number of bits per one DL frame remain unchanged with respect to the initial bit allocation and (ii) an active subcarrier should have a minimum of two bits assigned to the subcarrier (e.g., certain modulation/demodulation may not support a 1 bit subcarrier).

In certain embodiments, the bit swapping candidate identification block 1230 may employ hysteresis when identifying bit swapping candidates. For example, assume a bit swapping candidate is identified that can improve the worst SNR margin by 0.1 dB. In this example, executing the bit swapping in coordination with the transmitter (e.g., downlink transmitter at surface acquisition module or uplink transmitter at downhole telemetry module) may take a certain amount of time, such that the small gain of worst SNR margin may not improve the communication performance. Moreover, even if the bit swapping modification is executed, a subsequent bit swapping operation may reverse the previous bits back to the original subcarrier, resulting in repeated swapping of bits among subcarriers with similar SNR margin.

Accordingly, the bit swapping candidate identification block 1230 may employ hysteresis when identifying bit swapping candidates, such that a bit swap is effective when it improves the worst SNR margin by a predetermined threshold (e.g., 1 dB or more). Such hysteresis may prevent unnecessary bit swapping of bits among subcarriers with similar SNR margin and allow for converging to a state without bit swapping while noise conditions are stable.

The bit swapping candidate identification block 1230 may modify one or more bit allocations and provide a local BAT update 1232 to the BAT 362. The local BAT update 1232 may include an indication of the modified bit allocations. Additionally or alternatively, the bit swapping candidate identification block 1230 may send the BAT update to a surface acquisition module 118 (e.g., to be used for downlink) or to a downhole telemetry module 110 (e.g., to be used for uplink).

In certain embodiments, assuming the fast bit swapping operation is performed for downlink, the DMT receiver 1204 may send the BAT update to the surface acquisition module 118 in the form of a bit swapping request. With the downlink channel potentially unreliable, the downhole telemetry module 110 may not expect to receive an acknowledgement (ACK) from the surface acquisition module 118 in response to its request. Accordingly, in certain embodiments, the DMT receiver 1204 may send the bit swapping request without expecting to receive an ACK from the surface acquisition module 118.

For example, in such embodiments, sending the bit swapping request without expecting an ACK may involve modifying an existing UL ACK packet to include an additional payload word. The UL ACK packet may be used to indicate to the surface acquisition module 118 whether the downhole telemetry module 110 received one or more DL packets correctly in a previous transmission cycle.

In certain embodiments, the additional payload word may include information about a change to a single subcarrier (or tone) (e.g., "change subcarrier #X's bit allocation to Y bits"). In certain cases, a single bit-swapping request may not be considered complete until a set of bit-swapping requests, each with the additional payload word is transmitted to the surface acquisition module 118. That is, each DL bit swapping request may be transmitted to the surface acquisition module 118 over multiple UL ACK packets, where one UL ACK packet is used per transmission. In addition, a sequence number (SEQ) may be embedded in the additional payload word to allow the surface acquisition module 118 to restore a bit swapping request set upon reception.

Because the bit swapping request set may be sent without expecting an ACK, in certain embodiments, each bit swapping request set may be repeated a predetermined number of times (e.g., twice or more) in order to gain additional fault tolerance, In such embodiments, each UL ACK packet may be protected with a CRC, and a packet in error may be rejected by the surface acquisition module 118. Unless an error happens to the same sequence, both in the original set and the repeated set(s), the surface acquisition module may be able to restore the bit swapping request.

In certain embodiments, the DMT receiver 1204 may begin generating a new bit swapping request without waiting for completion of a previous bit swapping request. In such embodiments, the new bit swapping request generation may use the DL BAT (e.g., BAT 362) locally modified by the previously generated bit swapping request. This local copy of the DL BAT may be used for execution of the bit swapping logic and may not be used for demodulation. Consequently, the bit swapping execution may be a pipe-lined operation, where the next bit swapping request is being generated while a previous bit swapping request is being transmitted to the surface acquisition module 118.

Figure 13:
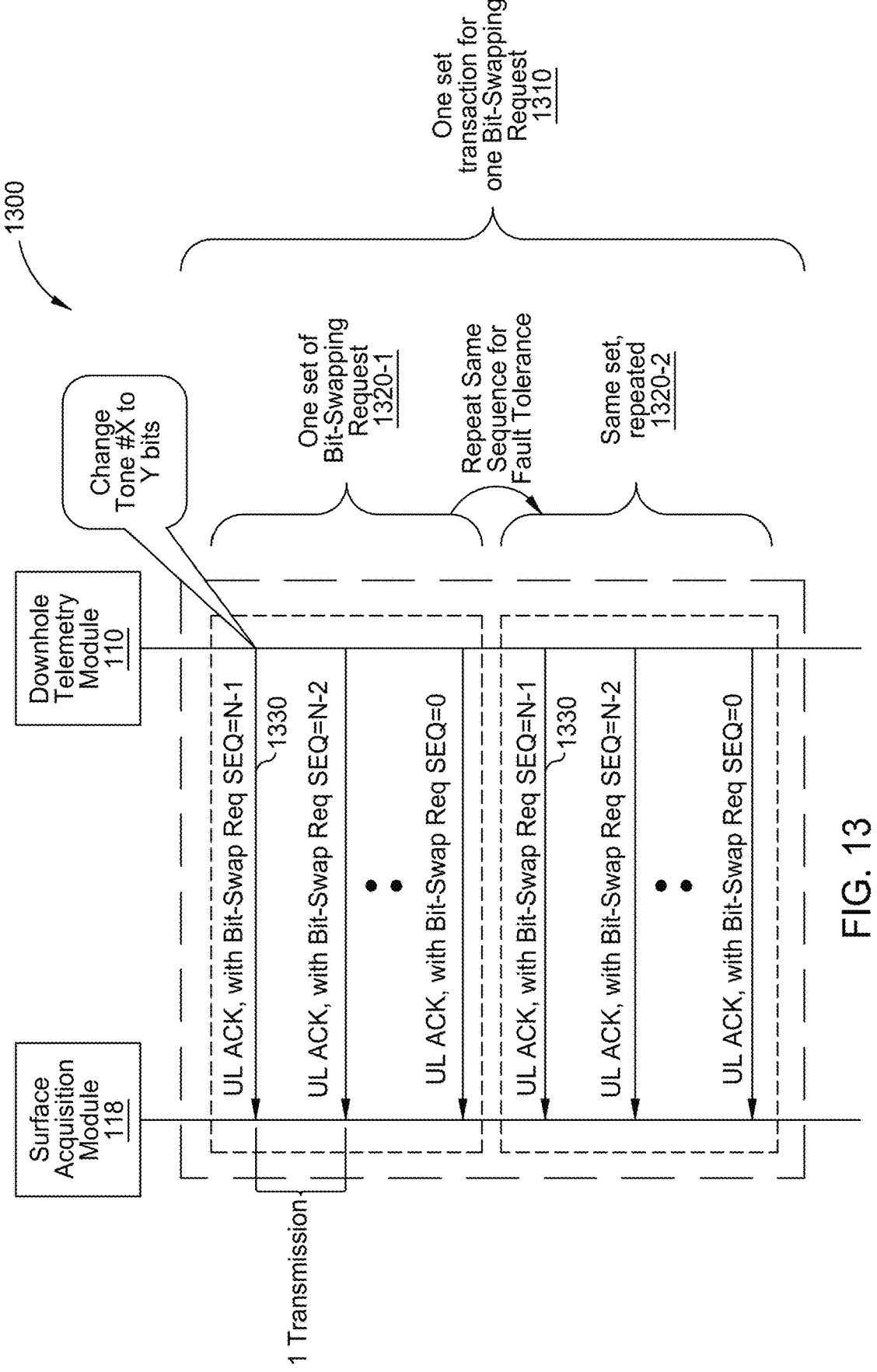
FIG. 13 illustrates an example downlink (DL) bit swapping request transmission protocol, according to certain embodiments.

By way of example, FIG. 13 illustrates an example DL bit swapping request transmission protocol 1300, according to various embodiments. While FIG. 13 depicts a DL bit swapping request transmission protocol to be used for downlink communications, it should be noted that similar techniques may be applied for uplink communications.

As shown, a single bit-swapping request transaction 1310 may include repeated bit swapping request sets 1320-1 and 1320-2. Each bit swapping request set 1320 may include the same sequence of N UL ACK transmissions 1330. Each of the N UL ACK transmissions 1330 may include an addi-tional payload word carrying information about a change to a single subcarrier (or tone) along with a respective SEQ indicating the position of the UL ACK transmission 1330 within the sequence of N UL ACK transmissions. Note that while FIG. 13 depicts the bit swapping request transaction 1310 including two repeated bit swapping request sets 1320, the bit swapping request transaction 1310 may include any number of repeated bit swapping request sets (e.g., in order to achieve a target (or desired) amount of fault tolerance).

Figure 14:
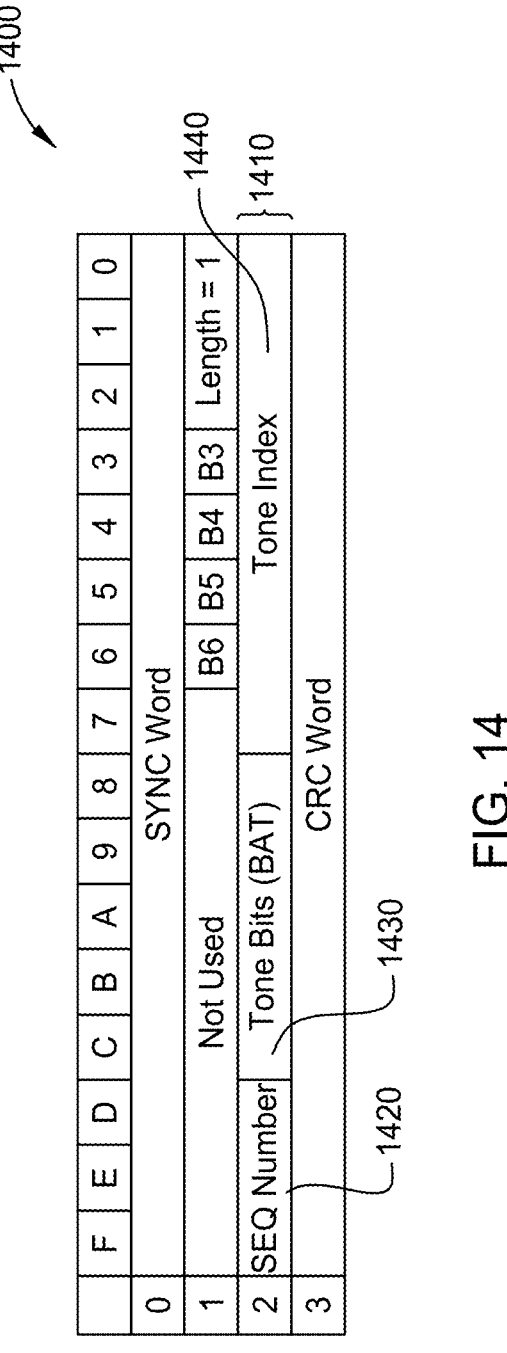
FIG. 14 depicts an example uplink (UL) acknowledgment (ACK) transmission format, according to certain embodiments.

FIG. 14 depicts an example UL ACK transmission format 1400, which may be used for a DL bit swapping request, according to various embodiments. The UL ACK transmis-sion format 1400 may be representative of a format of the UL ACK transmission 1330 in FIG. 13. As shown, the UL ACK transmission format 1400 includes three words of overhead (e.g., SYNC, LENGTH, and CRC), a DL super-packet (DLSP) ACK bit (B3), a DL ACK bit (B4), an UL bit swap ACK bit (B5), and UL error packet bit (B6), and a 16 bit additional payload word 1410. The payload word 1410 includes a SEQ number 1420, a tone bits field 1430 (e.g., BAT), and a tone index 1440.

The DLSP ACK bit (B3) may be set to "1" when the DL superpacket is received in error. The DL ACK bit (B4) may be set to "1" when a previous DL transmission indicates a DL ACK packet with no error. The UL bit swap ACK bit may be set to "1" when an UL bit swap ACK packet is received in a previous DL transmission.

In certain embodiments, the UL error packet bit (B6) is set when a previous downlink transmission has a maintenance packet to which a CRC error is detected. The UL error packet bit may enable the surface acquisition module 118 to count the number of errors and provide information regard-ing the errors to a user, e.g., via console output.

In certain embodiments, the tone index 1440 may include an indication of which subcarrier (or tone) number to modify its respective BAT. In some cases, the tone index 1440 may have a value between 1 and 255 to indicate the subcarrier # to modify its BAT. In some cases, the tone index 1440 may have a value of 0 to indicate no action.

In certain embodiments, the tone bits field 1430 may include an indication of a number of bits reassigned to the subcarrier indicated by the tone index 1440. For example, the most significant bit (MSB) of the tone bits field 1430 may be zero, and the lower four bits (e.g., B:8) of the tone bits field 1430 may be used to indicate the number of bits assigned to the subcarrier.

In certain embodiments, the SEQ number 1420 is used to represent one bit swapping request set (e.g., bit swapping request set 1320) including multiple UL ACK packets. In some cases, the SEQ number 1420 may use a decremental scheme. For example, for a bit swapping request for change to N subcarriers (N≤8), the first sequence may start with "N-1" and the last sequence may end with "0." In certain embodiments, a SEQ number=0 may indicate the timing for the downhole telemetry module 110 and the surface acqui-sition module 118 to apply the DL BAT change, before the next DL transmission starts. Until then, each reception of the UL ACK packet reconstructs one set of DL bit swapping request into a buffer.

As noted, each DL bit swapping request set (e.g., bit swapping request set 1320) of a DL bit swapping request transaction (e.g., bit swapping request transaction 1310) may be repeated a number of times to provide fault toler-ance. Consequently, the surface acquisition module 118 may not care if an UL ACK packet sequence is obtained (or received) in the initial DL bit swapping request set or in a repeated DL bit swapping request set. For example, if the initial bit swapping request set is successful, then repeated bit swapping request sets may not produce an effective BAT change, since the change may have been already applied from the initial bit swapping request set. On the other hand, if an error is detected in the first initial bit swapping request set, then the downlink BAT may become temporarily incon-sistent between the surface acquisition module 118 and the downhole telemetry module 110, but may be resolved after receiving a repeated bit swapping request set without error.

Figure 15:
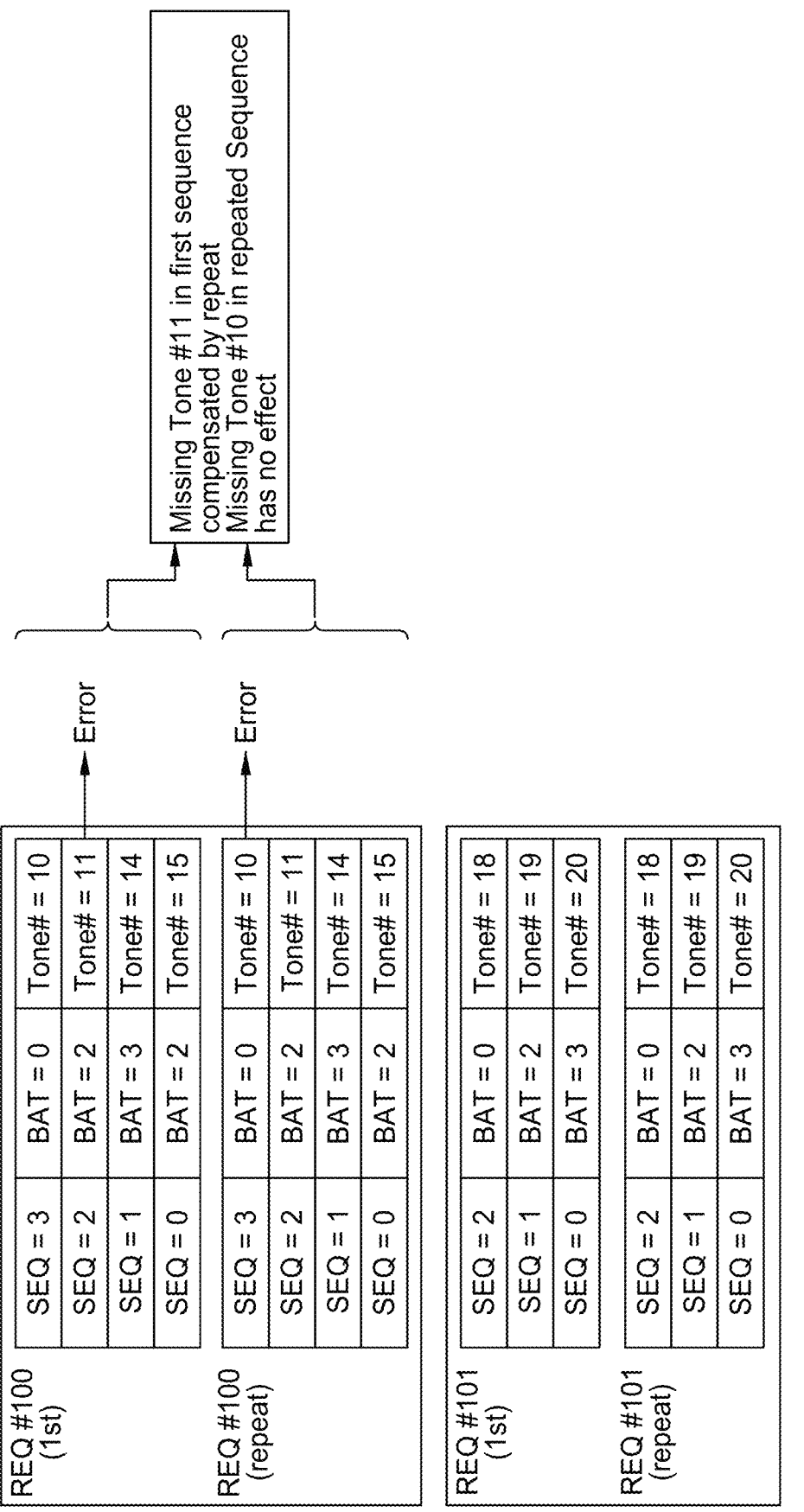
FIG. 15 illustrates an example scenario for improving fault tolerance based on repeating a bit swapping request set, according to certain embodiments.

By way of example, FIG. 15 illustrates an example scenario of improving fault tolerance based on repeating a bit swapping request set, according to various embodiments. As shown, the missing tone #11 in the initial sequence of bit swapping request set #100 may be compensated by the repeated sequence of bit swapping request set #100. Addi-tionally, the missing tone #10 in the repeated sequence of bit swapping request set #100 may have no effect on the receiver, since the tone #10 was received in the initial sequence of bit swapping request set #100. The number of repeating bit swapping request sets may be a hardcoded constant in the downhole telemetry module.

Figure 16:
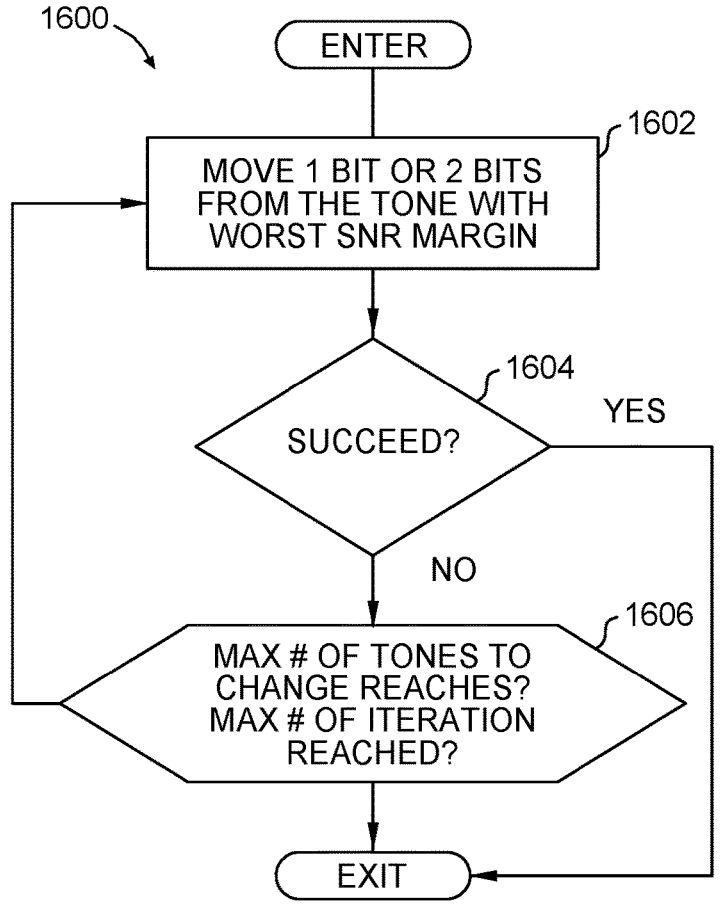
FIG. 16 is a flowchart of an example method for performing fast bit swapping, according to certain embodiments.

FIG. 16 is a flowchart of an example method 1600 for performing fast bit swapping, according to various embodi-ments. The method 1600 may be performed by a DMT receiver (e.g., DMT receiver 1204). In certain embodiments, the method 1600 may be implemented by the bit swapping candidate identification block 1230 as bit swapping logic. In certain embodiments, the method 1600 is performed itera-tively. The initial iteration may attempt to improve the worst SNR margin. Subsequent iterations, if executed, may per-form the same process assuming that the bit swapping of the subcarriers identified in the previous iteration has already been applied. With multiple iterations, the bit swapping logic may identify multiple subcarriers to modify their bit allocation in order to maximize the worst SNR margin among the subcarriers.

Method 1600 may enter at block 1602, where the DMT receiver moves a set of bits (e.g., 1 bit or 2 bits) from the subcarrier with the worst SNR margin. At block 1604, if the bit allocation modification is successful, then method 1600 may exit; otherwise, the method 1600 proceeds to block 1606.

At block 1606, the DMT receiver determines whether at least one of (i) a maximum number of subcarriers to change has been reached or (ii) a maximum number of iterations has been reached. If not, then the method 1600 proceeds to block 1602 (e.g., for the next iteration). If so, then the method 1600 exits.

In some cases, from the $2^{nd}$ iteration, newly located bit-swapping can have duplicated subcarriers from a previous iteration. For instance, with heavily deteriorated tone suddenly, multiple iterations may find a solution to remove multiple bits from one subcarrier to other subcarriers. In such instances, the merge may be incorporated as a part of the iteration.

In certain embodiments, there may be various bit swapping patterns for performing the bit swapping in block 1602. For example, the patterns may include (i) moving 1 bit from the subcarrier with the worst SNR margin to another used subcarrier, (ii) moving 1 bit from the subcarrier with the worst SNR margin, together with another bit from another subcarrier, to an unused subcarrier (e.g., enabling the subcarrier), (iii) moving 2 bits from the subcarrier with the worst SNR margin (e.g., disabling the subcarrier) to 1 unused subcarrier (e.g., enabling the subcarrier), (iv) moving 2 bits from the subcarrier with the worst SNR margin (e.g., disabling the subcarrier) to 1 used subcarrier or 2 used subcarriers, or (v) refraining from swapping bits.

Figure 17:
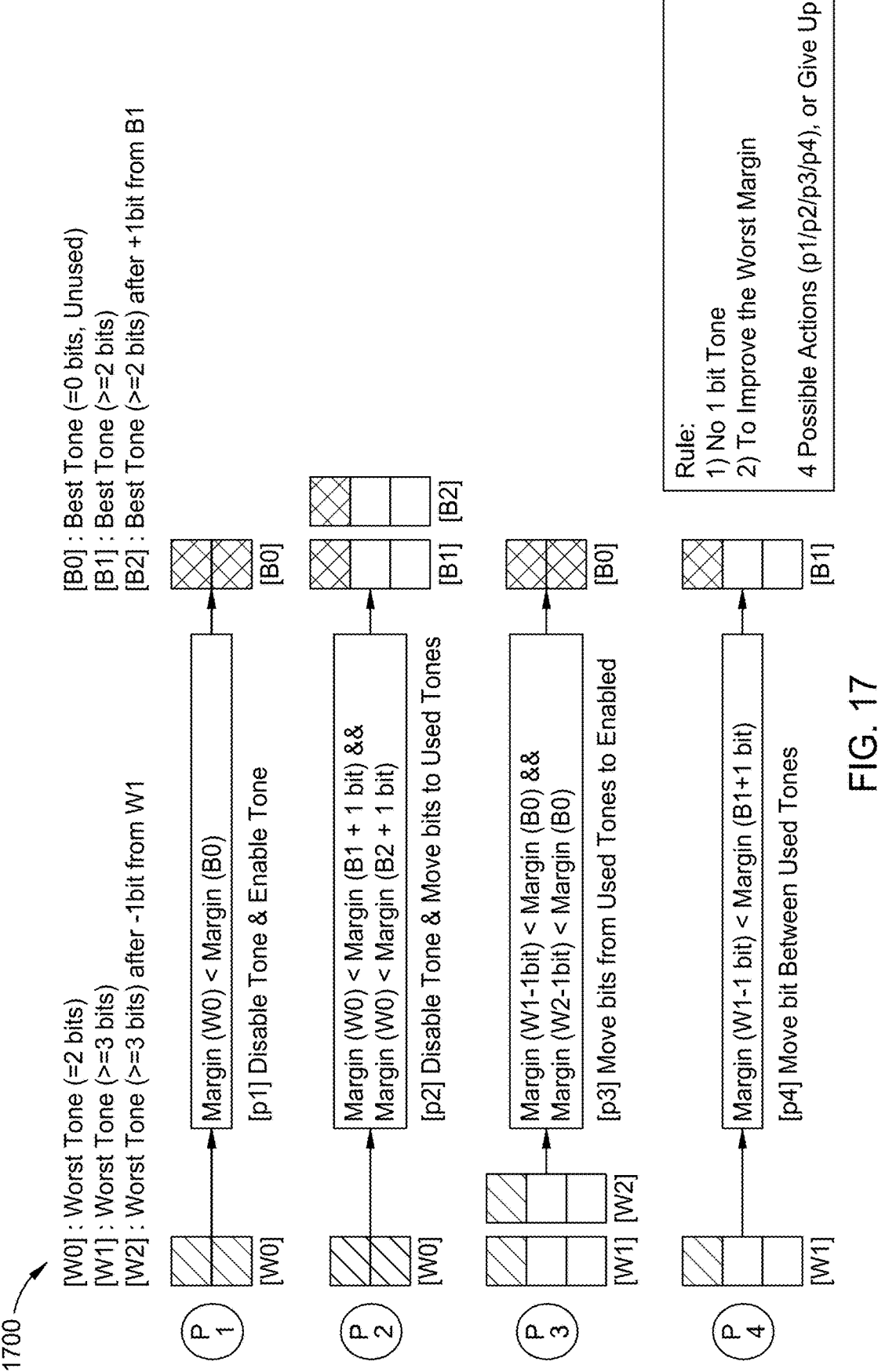
FIG. 17 depicts example bit swapping patterns, according to certain embodiments.

By way of example, consider FIG. 17 which depicts example bit swapping patterns P1 1700-1, P2 1700-2, P3 1700-3, and P4 1700-4 available for an iteration of the bit swapping logic described herein, according to various embodiments. In FIG. 17, P1 1700-1 may move 2 bits from one subcarrier W0 having 2 allocated bits (e.g., eliminating the subcarrier W0) to another unused subcarrier B0 (e.g., enabling the subcarrier B0). Here, the subcarrier W0 may have the worst SNR margin among subcarriers having 2 allocated bits, the subcarrier B0 may have the best SRN margin among subcarriers with 0 allocated bits, and the SNR margin of subcarrier W0 is less than the SNR margin of subcarrier B0. Because the subcarrier W0 has 2 allocated bits, it may not be possible to remove 1 bit from subcarrier W0, since this would leave subcarrier W0 with 1 remaining bit.

P2 1700-2 may move 2 bits from one subcarrier W0 having 2 allocated bits (e.g., eliminating the subcarrier W0) to 2 different used subcarriers B1 and B2. Note, in certain embodiments, the 2 bits from subcarrier W0 may be moved to the same subcarrier (e.g., B1 or B2). Here, the subcarrier W0 may have the worst SNR margin among subcarriers having 2 allocated bits, the subcarrier B1 may have the best SNR margin among subcarriers having at least 2 allocated bits, the subcarrier B2 may have the best SNR margin among subcarriers having at least 2 allocated bits after 1 bit has been added to subcarrier B1, the SNR margin of subcarrier W0 is less than the SNR margin of subcarrier B1 (with 1 bit), and the SNR margin of subcarrier W0 is less than the SNR margin of subcarrier B2 (with 1 bit).

P3 1700-3 may move 1 bit from one used subcarrier W1 and 1 bit from another used subcarrier W2 to an unused subcarrier B0 (e.g., reviving subcarrier B0). In certain embodiments, this pattern can move 2 bits from one used subcarrier to an unused subcarrier, when there are more than 2 bits remaining in the used subcarrier after taking the 2 bits (e.g., the used subcarrier is not eliminated). Here, the subcarrier W1 may have the worst SNR margin among subcarriers having at least 3 allocated bits, the subcarrier W2 may have the worst SNR margin among subcarriers having at least 3 allocated bits after 1 bit is removed from subcarrier W1, the subcarrier B0 may have the best SNR margin among subcarriers having 2 allocated bits, the SNR margin of subcarrier W1 with 2 allocated bits is less than the SNR margin of subcarrier B0, and the SNR margin of subcarrier W2 with 2 allocated bits is less than the SNR margin of subcarrier B0.

P4 1700-4 may move 1 bit from a used subcarrier W1 to another used subcarrier B2. Here, the subcarrier W1 may have the worst SNR margin among subcarriers having at least 3 allocated bits, the subcarrier B1 may have the best SNR margin among subcarriers having at least 2 allocated bits, and the SNR margin of subcarrier W1 with 2 allocated bits is less than the SNR margin of subcarrier B1 with 3 allocated bits.

In FIG. 17, a single iteration of the bit swapping logic may search for the best pattern out of P1 1700-1 to P4 1700-4 that reduces the worst SNR margin. Additionally, with hysteresis incorporated in the bit move criteria for P1 1700-1 to P4 1700-4, a single iteration of the bit swapping logic may search for the best pattern out of P1 1700-1 to P4 1700-4 that improves the worst SNR margin by a predetermined threshold amount.

Example Error Correction Coding

Some legacy DMT systems do not support error correction coding. Such systems, for example, may lack hardware capability to support the computational load typically associated with providing error correction coding.

To address this, the present disclosure provides techniques for implementing error correction coding in a DMT system. In certain embodiments, trellis coded modulation (TCM) is used as an error correction coding scheme in DMT systems for single-mode telemetry applications. TCM may be implemented on uplink and downlink with differences arising from the computational resources available on each end of the communication.

TCM is a modulation scheme that transmits information with high efficiency over band-limited channels. TCM combines modulation and encoding processes to achieve high efficiency without increasing the bandwidth. For example, in TCM, the transmitter modulates the phase and the amplitude of a signal. The transmitted signal is created by convolutionally encoding the binary input signal and mapping the result to a signal constellation. At the receiver, the modulated signal may use the Viterbi algorithm to decode TCM modulated signals. Further information regarding TCM is specified in ITU-T Recommendation 992.3-2005.

Certain embodiments described herein provide techniques for implementing TCM to adapt to the wireline channel typically used in single-mode telemetry applications. For example, certain embodiments provide a processor mapper/demapper implementation for TCM, an interleaver designed to increase the coding gain of TCM, and a TCM implementation using multiple processors (as well as a partition of tasks among the processors).

Figure 18:
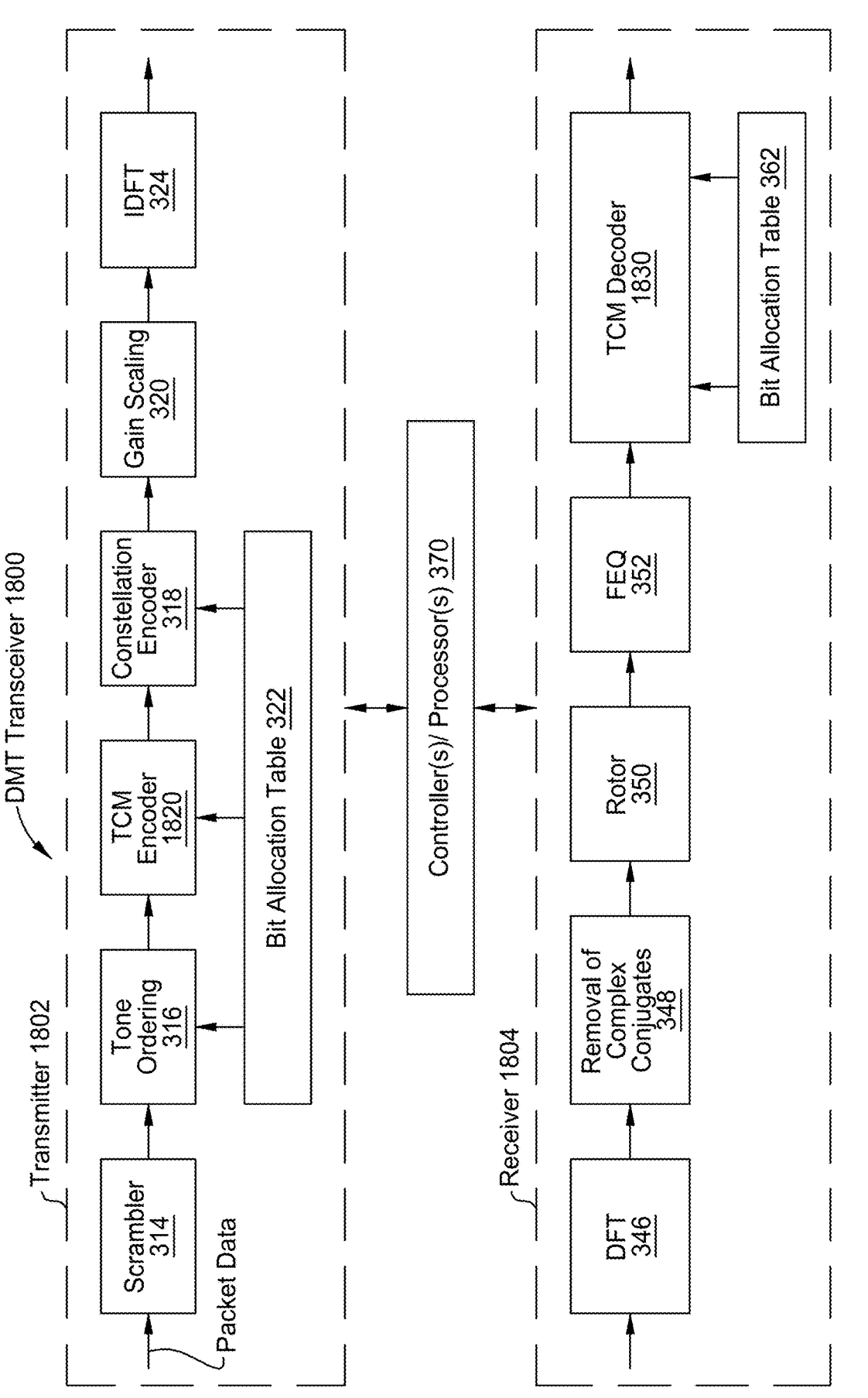
FIG. 18 illustrates at least a portion of a DMT transceiver, according to certain embodiments.

By way of example, FIG. 18 illustrates at least a portion of a DMT transceiver 1800, according to various embodiments. The DMT transceiver 1800 includes a DMT transmitter 1802 and a DMT receiver 1804. Compared to the DMT transmitter 302 of the DMT transceiver 300 illustrated in FIG. 3, the DMT transmitter 1802 includes a TCM encoder 1820 configured to implement TCM encoding of a DMT signal using one or more techniques described herein. Similarly, compared to the DMT receiver 304 of the DMT transceiver 300 illustrated in FIG. 3, the DMT receiver 1804 includes a TCM decoder 1830 configured to implement TCM decoding of a DMT signal according to one or more techniques described herein. The DMT transceiver 1800 may be used for uplink and downlink communications. For example, the DMT transceiver 1800 may be representative of the DMT transceiver 210 of the surface acquisition module 118 or the DMT transceiver 230 of the downhole telemetry module 110.

In order to support the computational load associated with implementing TCM encoding/decoding, the DMT transceiver 1800 of surface acquisition module 118 may be configured to use multiple processors to perform TCM encoding/decoding. For example, in certain embodiments, the controller(s)/processor(s) 370 may include a digital signal processor (DSP) and a co-processor. The co-processor may be implemented with a field-programmable gate array (FPGA), as an illustrative example.

In certain cases, the downhole telemetry module 110 may not be configured to use a co-processor in addition to a DSP. That is, the controller(s)/processor(s) 370 may include a DSP but may not be able to use an FPGA as a co-processor. In such cases, a significant portion or all of the computational load associated with implementing TCM encoding/decoding may be on the DSP. One of the operations involved in mapping a sequence of bits into the constellation X and Y coordinates involves the demultiplexing operation of their individual bits (e.g., as specified in ITU-TG.992.3-2005).

Figures 19A, 19B:
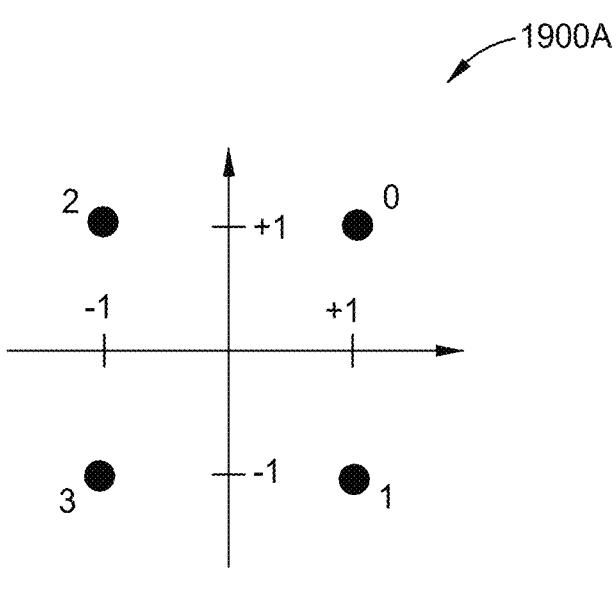
FIGS. 19A and 19B illustrate example constellations, according to certain embodiments.

By way of example, consider FIGS. 19A and 19B illustrating example constellations 1900A and 1900B, respectively, for different values of an even number of bits (b). In particular, FIG. 19A illustrates an example constellation 1900A for b=2 and FIG. 19B illustrates an example constellation 1900B for b=4. for an even number of bits (b), the integer values X and Y of the constellation point (X, Y) may be determined from the b bits $\{v_{b-1}, v_{b-2}, \ldots, v_1, v_0\}$, where X and Y are the odd integers with two-complement binary representations $(v_{b-1}, v_{b-3}, \ldots, v_1, 1)$ and $(v_{b-2}, v_{b-4}, \ldots, v_0, 1)$, respectively. The most significant bits (MSBs), $v_{b-1}$ and $v_{b-2}$, are the sign bits for X and Y, respectively. Note, for an odd number of bits, the constellation mapping for the MSBs of the odd number of bits may be similar to the constellation mapping for the even number of bits, where the least significant bits (LSBs) may be mapped using a look-up table (LUT).

Legacy implementations of demultiplexing operations generally use an interleaving table precalculated for 16 bits and may use 64 kilobytes of memory. Certain embodiments herein may enable a demultiplexing operation to be performed with an interleaving table with a smaller number of bits in order to optimize (or at least improve) the demultiplexing operation. For example, in certain embodiments, the interleaving table may be reduced to 7 bits and re-used for even or odd bits by using bit shifts.

Figures 20, 21, 22:
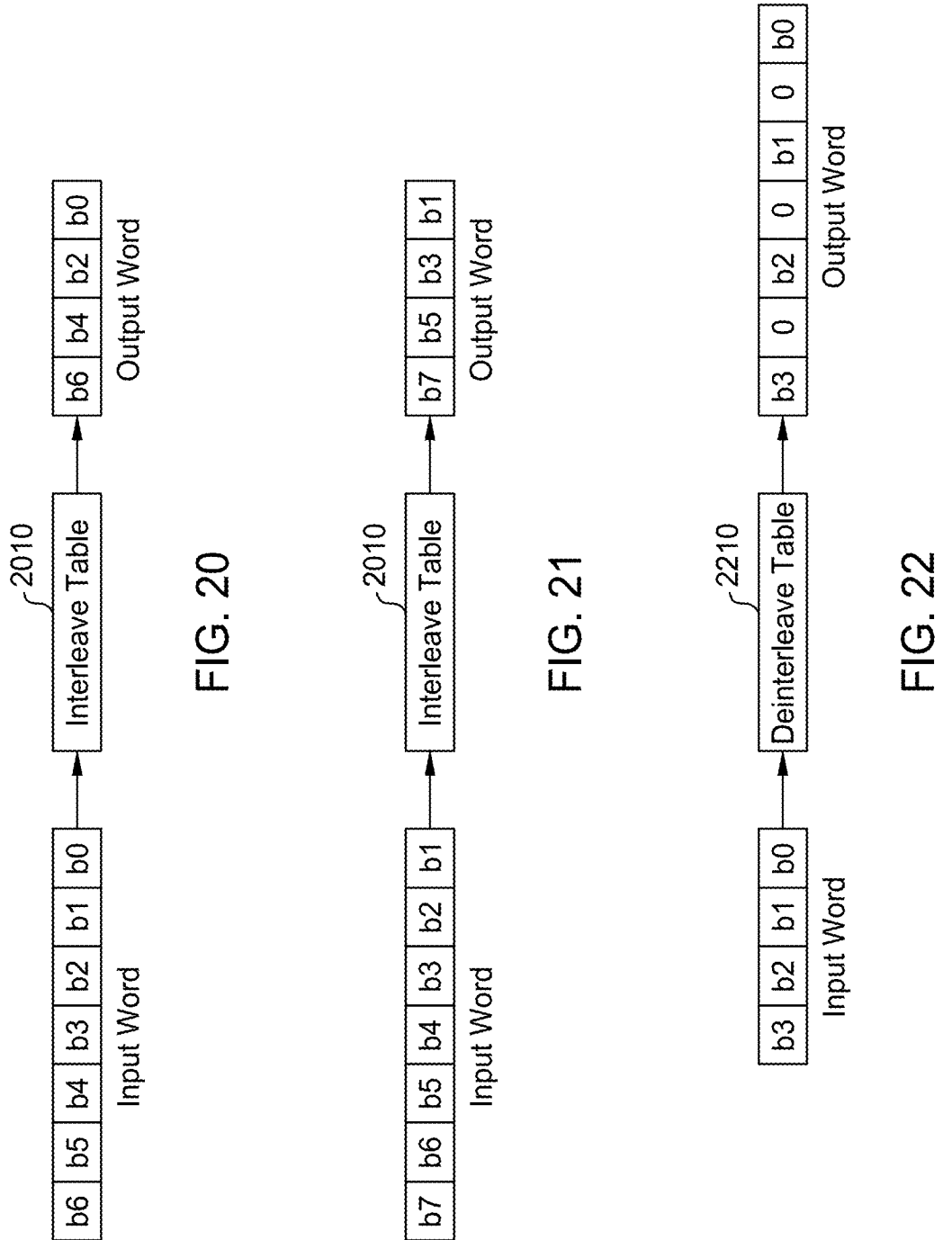
FIG. 20 illustrates a mapper interleaving table for even bits, according to certain embodiments.
FIG. 21 illustrates a mapper interleaving table for odd bits, according to certain embodiments.
FIG. 22 illustrates a demapping deinterleaving table, according to certain embodiments.

By way of example, FIG. 20 illustrates a mapper interleaving table 2010 for even bits, according to various embodiments. To reuse the mapper interleaving table 2010 for odd bits, the input may be shifted by 1 bit before passing through the LUT, e.g., as shown in FIG. 21. On the decoding side, a deinterleaving table may be employed for demapping operations. By way of example, FIG. 22 illustrates a demapping deinterleaving table 2210, according to various embodiments.

Figure 23:
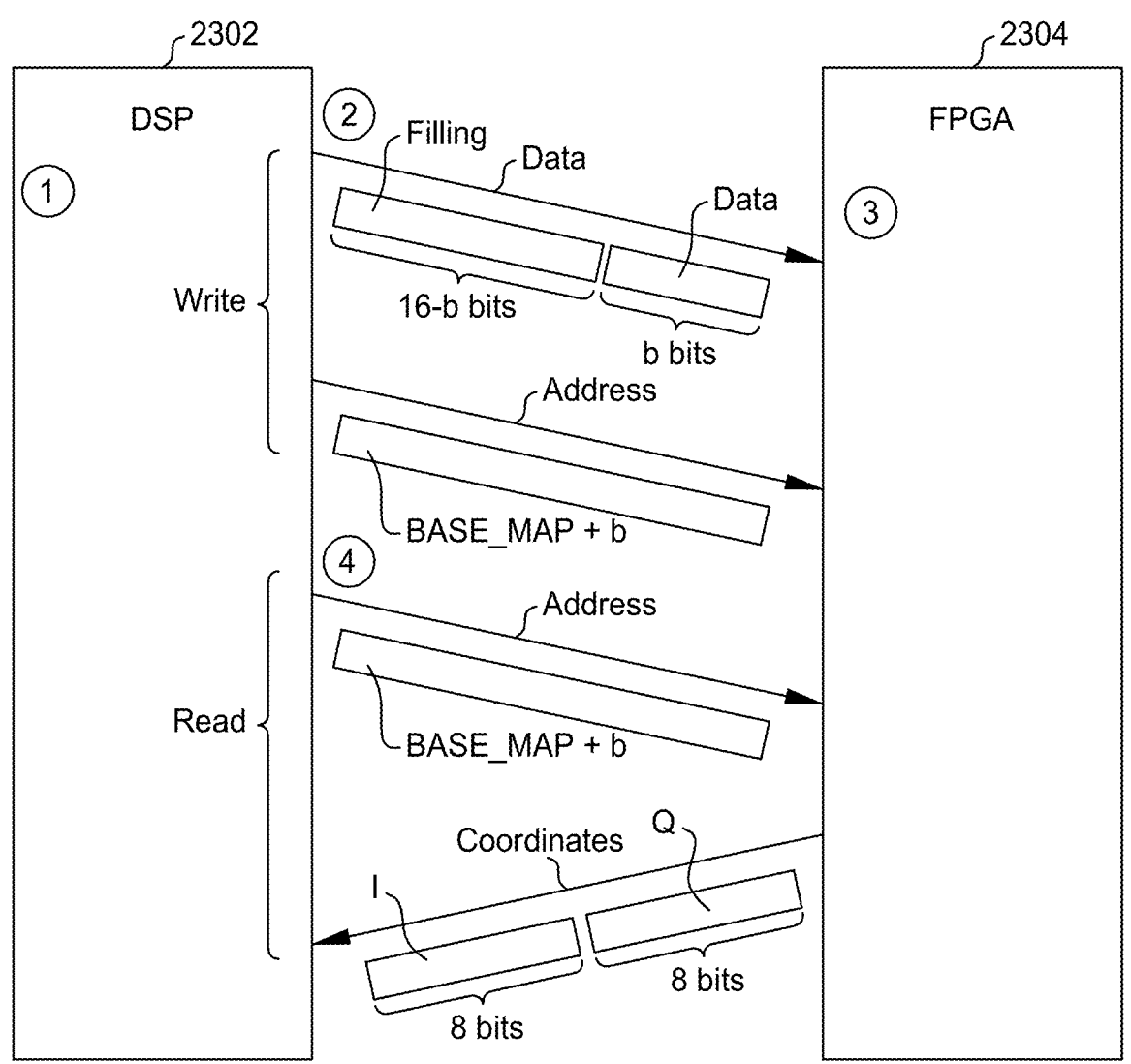
FIG. 23 illustrates an example scenario for constellation mapping offloading on a co-processor, according to certain embodiments.
Figure 24:
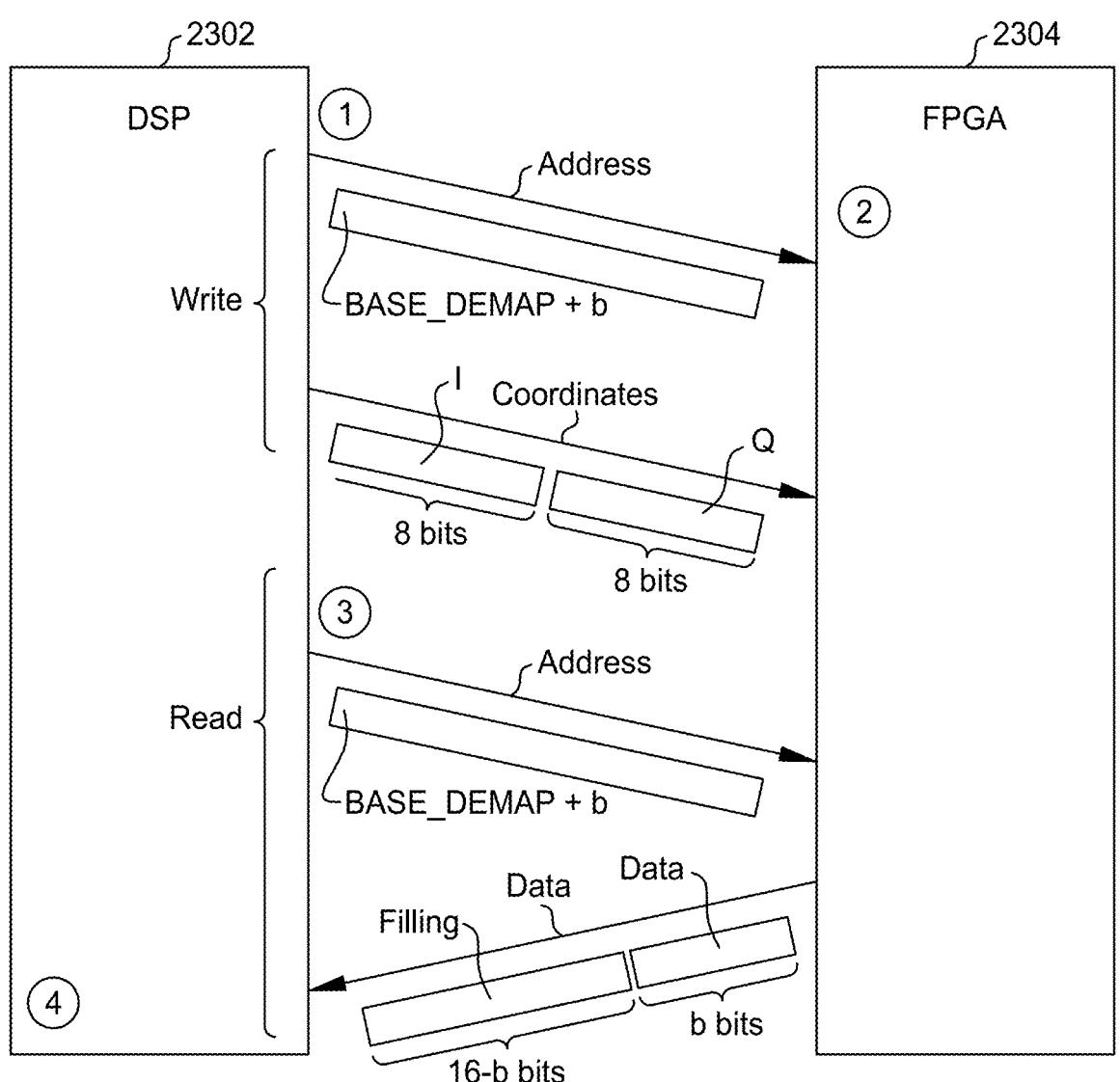
FIG. 24 illustrates an example scenario for constellation demapping offloading on a co-processor, according to certain embodiments.

FIG. 23 illustrates an example scenario for constellation mapping offloading on a co-processor, according to various embodiments. In FIG. 23, the constellation mapping operation may be offloaded on the FPGA 2304 which is used as a co-processor for the DSP 2302. FIG. 24 illustrates an example scenario 2400 for constellation demapping offloading on a co-processor, according to various embodiments. In FIG. 24, the constellation demapping operation may be offloaded on the FPGA 2304 which is used as a co-processor for the DSP 2302.

Figure 25:
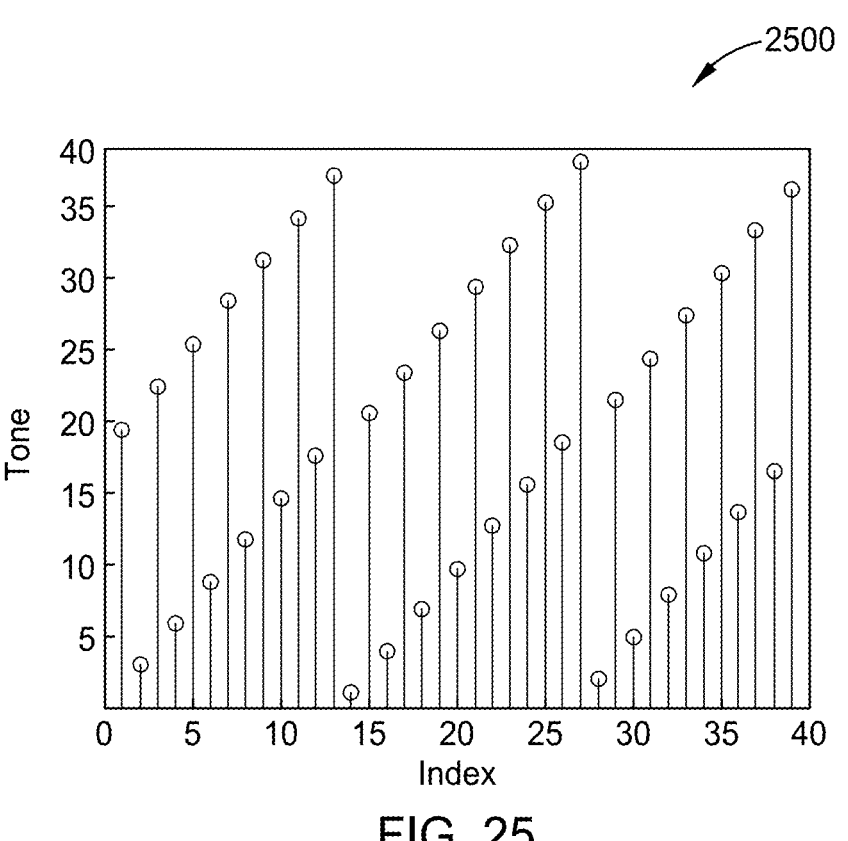
FIG. 25 depicts a graph of values of an interleaving table, according to certain embodiments.

As noted, certain embodiments provide an interleaver designed to increase the coding gain of TCM. Interleavers are commonly used in association with convolutional coding with the purpose of increasing the resilience to bursts of errors. In certain embodiments, a two-level interleaver is generated and employed to achieve maximum separation between the two tones in a pair (first level) and to interleave the tone pairs according to a modulus function using a constant of 7 (second level). The interleaving table may be re-calculated at the beginning of every transmission due to changes in the number and/or location of tones induced by the bit swapping function. By way of example, the values of the interleaving table for 40 contiguous tones are illustrated in graph 2500 of FIG. 25.

Certain embodiments provide various functions that may implemented by the TCM decoder 1830 in order to perform TCM decoding. TCM may involve calculating distances between the received coordinate and four constellation coordinates per tone. Each of the four constellation coordinates belongs to a different two-dimensional (2D) coset. Two 2D cosets may be combined to form one four-dimensional (4D) coset with eight elements plus a u3 bit. Thus, in certain embodiments, a "first" function in the TCM decoding process may involve finding the four nearest constellation points, calculating their respective distance to the received point, and identifying the 2D coset from the constellation bits. The data points for each of the four possible constellation bits may be stored in memory for later execution.

The TCM decoder 1830 may also implement a "second" function that involves calculating the distances of each tone pair to the 4D cosets and determining the most likely u3 bit value associated to each 4D coset. The mappings from the 2D cosets to the 4D cosets may be implemented using LUTs. The u3 bits may be stored in a matrix for later recovery during a traceback operation. The TCM decoder 1830 may implement a "third" function that involves updating the Trellis, which is composed of the metrics vector and the traceback matrix, based on the distances to each 4D coset.

The TCM decoder 1830 may implement a "fourth" function (e.g., traceback function) that involves using the resulting traceback matrix and the LUTs to recover the u3u2u1u0 bits. Alternatively, the u3 bit may be obtained during a data recovery stage. The results may be stored in a branch coset matrix. The TCM decoder 1830 may implement a "fifth" function (e.g., data recovery function) that involves using the branch coset matrix (including bits u3u2u1u0) to recover the 2D cosets for each tone in a pair. The 2D cosets may be used to recover the uncoded data bits.

Figure 26:
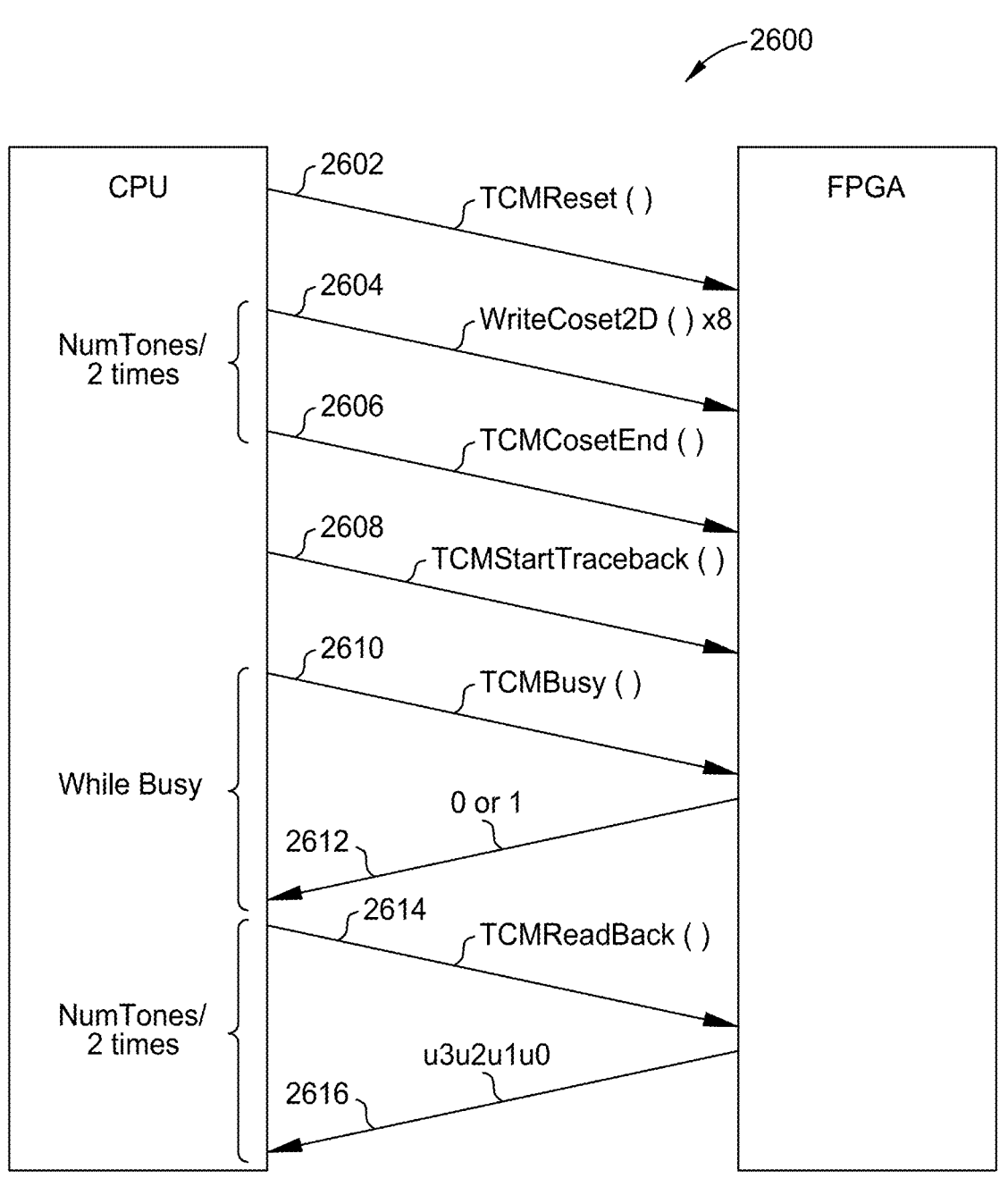
FIG. 26 illustrates an example control protocol for performing trellis coded modulation (TCM) decoding using multiple processors, according to certain embodiments.

In certain embodiments, in order to support the computational load associated with implementing TCM decoding at the surface acquisition module 118, the DMT transceiver 1800 of surface acquisition module 118 may be configured to use multiple processors to perform TCM decoding. That is, the controller(s)/processor(s) 370 may include a DSP (e.g., DSP 2302) and a co-processor (e.g., FPGA 2304). By way of example, FIG. 26 illustrates an example control protocol 2600 for performing TCM decoding using multiple processors, according to various embodiments. In particular, the control protocol 2600 includes a sequence of instructions that the DSP may execute in order to control the co-processor TCM decoder.

At 2602, the DSP executes a TCMReset function in order to reset the TCM decoder engine at the beginning of each frame. Resetting the TCM decoder engine may involve setting the tone pair counter and the trellis metrics vector to zero.

At 2604, the DSP executes a writecoset2D function. Here, each time that the distance against a 2D coset is calculated, it is written to the co-processor using an 8-bit unsigned format. The value of the coset as well as the tone may also be written (e.g., two tones×4 2D cosets=8 tone-coset combinations). It may be the responsibility of the DSP to assure that all eight combinations are written (in any sequence), since there may be no check for completeness in the co-processor.

At 2606, the DSP executes a TCMCosetEnd function. This function signals to the co-processor that the 8 2D distances for a tone pair have been written. The co-processor may use this signal to start the 4D distance calculations and update of the trellis.

At 2608, the DSP executes a TCMStartTraceback function. This function signals the co-processor that all the distances for the tone pairs have been written, and that the traceback operation can start.

At 2610, the DSP executes a TCMBusy function. This function polls the co-processor for termination of the traceback operation. At 2612, the TCMBusy function may return 1 if the traceback operation is running, and may return 0 once the recovered sequence of bits u3u2u1u0 are available in the recovery memory.

At 2614, the DSP executes a TCMReadBack function. This function reads the contents of the u3u2u1u0 array from the co-processor to the DSP (2616).

In some cases, implementing TCM may be impacted by the bit swapping functionality described herein. As noted, the bit swapping functionality may update the bit allocations to equalize the SNR margin. To achieve this objective, bits can be swapped between tones, and tones can be "disabled" or "enabled." However, in some cases, swapping bits may have the effect of changing the number of tones and therefore the number of TCM overhead bits, calculated according to the following equation: TCM overhead: (NumTones+1)/2+TailBits. Anytime a tone is disabled or enabled, the change in overhead may be accounted for to prevent changes in the number of payload bits.

Example Operations

FIG. 27 is a flow diagram depicting an example operations 2700 for DMT communications in a DMT-based wireline telemetry system, according to various embodiments. The operations 2700 may be performed, for example, by a surface acquisition module (e.g., surface acquisition module 118).

The operations 2700 may involve, at block 2702, initiating a first training sequence with a downhole telemetry module using a first bandwidth of a plurality of bandwidths via a communication link between the surface acquisition module and the downhole telemetry module.

The operations 2700 may also involve, at block 2704, automatically selecting a second bandwidth of the plurality of bandwidths for a communication session between the surface acquisition module and the downhole telemetry module using the communication link, based on the first training sequence, the second bandwidth being greater than the first bandwidth.

The operations 2700 may also involve, at block 2706, exchanging data with the downhole telemetry module during the communication session based on the second bandwidth.

In certain embodiments, the operations 2700 may further involve: receiving, during the first training sequence, a set of training tones from the downhole telemetry module via the communication link; and measuring a respective power of a first training tone of the set of training tones and a second training tone of the set of training tones.

In certain embodiments, the second bandwidth is automatically selected when the power of the first training tone and the power of the second training tone satisfy a predetermined condition. The predetermined condition may include a difference between the power of the first training tone and the power of the second training tone being greater than a threshold.

In certain embodiments, determining that the attempt with the one of the plurality of telemetry protocols is successful includes receiving a response from the surface acquisition module within a predefined amount of time after initiation of the attempt, prior to a threshold number of retries of the attempt, or a combination thereof.

In certain embodiments, the operations 2700 may further involve initiating a second training sequence with the downhole telemetry module at the second bandwidth, after initiating the first training sequence and prior to exchanging data with the downhole telemetry module during the communication session.

In such embodiments, the operations 2700 may further involve: determining, during the second training sequence, one or more metrics indicative of a quality of the communication link; determining, a usable portion of the second bandwidth for the communication link, based on the one or more metrics; allocating available transmission power to the usable portion of the second bandwidth; and initiating a third training sequence with the downhole telemetry module, based on the transmission power allocated to the usable portion of the second bandwidth, after initiating the second training sequence and prior to exchanging data with the downhole telemetry module during the communication session. The one or more metrics may include an SNR of the communication link. The second bandwidth may include a plurality of subcarriers, the usable portion of the second bandwidth may include a first set of subcarriers of the plurality of subcarriers, and allocating the available transmission power to the usable portion of the second bandwidth may include reallocating transmission power from a second set of subcarriers of the plurality of subcarriers to the first set of subcarriers.

Additionally, in such embodiments, the operations 2700 may further involve adjusting, during the third training sequence, a receiver gain of the surface acquisition module based at least in part on the transmission power allocated to the usable portion of the second bandwidth.

In certain embodiments, exchanging data with the downhole telemetry module may involve: receiving, from the downhole telemetry module, an indication of a BAT update; and dynamically allocating data among a set of subcarriers within the second bandwidth, based on the BAT update. The BAT update may be based on a respective SNR of each subcarrier of the set of subcarriers. In such embodiments, dynamically allocating the data among the set of subcarriers may include moving a number of bits from a first subcarrier within the set of subcarriers to a second subcarrier within the set of subcarriers. The first subcarrier may have an SNR margin less than an SNR margin of the second subcarrier.

In certain embodiments, the operations 2700 may further involve receiving a bit-swapping request from the downhole telemetry module during the communication session, In such embodiments, dynamically allocating the data among the set of subcarriers may involve: dynamically allocating the data among the set of subcarriers in response to the bit-swapping request; and refraining from sending an acknowledgment to the downhole telemetry module after dynamically allocating the data among the set of subcarriers. The bit swapping request may be included within an acknowledgment message.

In certain embodiments, the operations 2700 may further involve exchanging data with the downhole telemetry module comprises transmitting data to the downhole telemetry module using an error control coding scheme. In such embodiments, using the error control coding scheme may involve: performing a first set of operations of the error control coding scheme via a first processor; and offloading a second set of operations of the error control coding scheme to a second processor. The error control coding scheme may include trellis coded modulation.

FIG. 28 is a flow diagram depicting an example operations 2800 for DMT communications in a DMT-based wireline telemetry system, according to various embodiments. The operations 2800 may be performed, for example, by a downhole telemetry module (e.g., downhole telemetry module 110).

The operations 2800 may involve, at block 2802, initiating a first training sequence with a surface acquisition module at a first bandwidth of a plurality of bandwidths via a communication link between the surface acquisition module and the downhole telemetry module.

The operations 2800 may also involve, at block 2804, automatically selecting a second bandwidth of the plurality of bandwidths for a communication session between the surface acquisition module and the downhole telemetry module using the communication link, based on the first training sequence, the second bandwidth being greater than the first bandwidth.

The operations 2800 may further involve, at block 2806, exchanging data with the surface acquisition module during the communication session according to the second bandwidth.

In certain embodiments, the operations 2800 may further involve: determining, during the first training sequence, one or more metrics indicative of a quality of the communication link; determining, a usable portion of the first bandwidth for the communication link, based on the one or more metrics; allocating available transmission power to the usable portion of the first bandwidth; and initiating a second training sequence with the surface acquisition module, based on the transmission power allocated to the usable portion of the first bandwidth, after initiating the first training sequence and prior to exchanging data with the surface acquisition module during the communication session.

Example Computing Device

Figure 29:
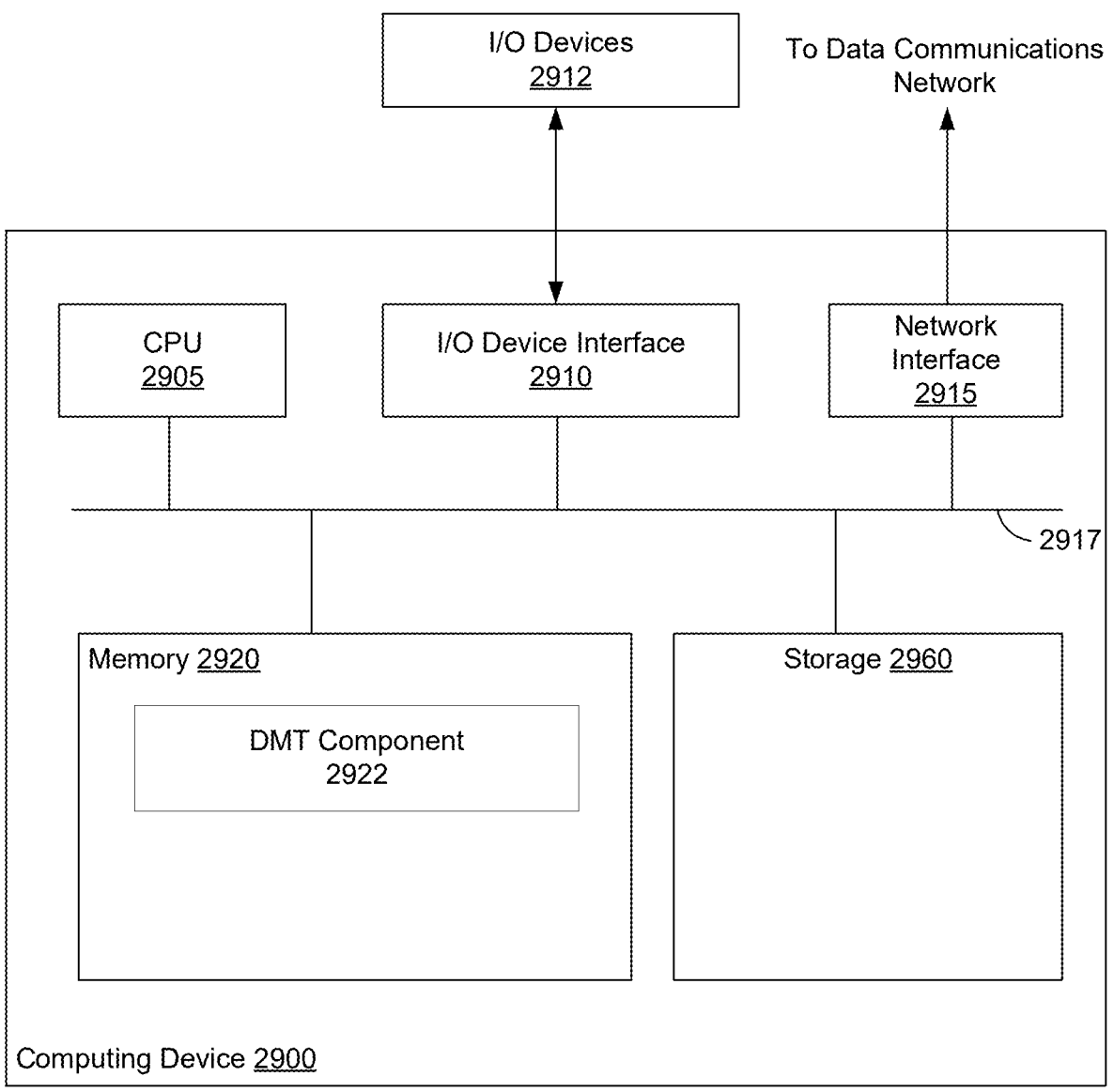
FIG. 29 depicts an example computing device, according to certain embodiments.

FIG. 29 illustrates an example computing device 2900 configured to perform DMT communications in a DMT-based wireline telemetry system, according to various embodiments., In certain embodiments, the computing device 2900 may be configured to perform method 700 illustrated in FIG. 7, method 800 illustrated in FIG. 8, method 1600 illustrated in FIG. 16, operations 2700 illustrated in FIG. 27, operations 2800 illustrated in FIG. 28, or any other technique or combination of techniques described herein. In certain embodiments, the computing device 2900 is representative of a downhole telemetry module (e.g., downhole telemetry module 110) or a surface acquisition module (e.g., surface acquisition module 118).

As shown, the computing device 2900 includes, without limitation, a central processing unit (CPU) 2905, a network interface 2915, a memory 2920, and storage 2960, each connected to a bus 2917. The computing device 2900 may also include an input/output (I/O) device interface 2910 connecting I/O devices 2912 (e.g., keyboard, display and mouse devices) to the computing device 2900. The computing device 2900 is generally under the control of an operating system (not shown).

The CPU 2905 retrieves and executes programming instructions stored in the memory 2920 as well as stored in the storage 2960. The bus 2917 is used to transmit programming instructions and application data between the CPU 2905, I/O device interface 2910, storage 2960, network interface 2915, and memory 2920. Note, CPU 2905 is included to be representative of a single CPU, multiple CPUs, a single CPU having multiple processing cores, and the like, and the memory 2920 is generally included to be representative of a random access memory. The storage 2960 may be a disk drive or flash storage device. Although shown as a single unit, the storage 2960 may be a combination of fixed and/or removable storage devices, such as fixed disc drives, removable memory cards, optical storage, network attached storage (NAS), or a storage area-network (SAN).

Illustratively, the memory 2920 includes a DMT component 2922, which is configured to method 700 illustrated in FIG. 7, method 800 illustrated in FIG. 8, method 1600 illustrated in FIG. 16, operations 2700 illustrated in FIG. 27, operations 2800 illustrated in FIG. 28, or any other technique (or combination of techniques) described herein. Note, while FIG. 29 depicts the DMT component 2922 within memory 2920, which is generally representative of volatile memory (e.g., random access memory), in certain embodiments, the DMT component 2922 is included in persistent (e.g., non-volatile) memory or persistent (e.g., non-volatile) storage, such as storage 2960 of FIG. 29.

Example Clauses

Implementation examples are described in the following numbered clauses:

Clause 1: A method performed by a surface acquisition module in a discrete multitone (DMT) modulation system, the method comprising: initiating a first training sequence with a downhole telemetry module using a first bandwidth of a plurality of bandwidths via a communication link between the surface acquisition module and the downhole telemetry module; automatically selecting a second bandwidth of the plurality of bandwidths for a communication session between the surface acquisition module and the downhole telemetry module using the communication link, based on the first training sequence, the second bandwidth being greater than the first bandwidth; and exchanging data with the downhole telemetry module during the communication session based on the second bandwidth.

Clause 2: The method of Clause 1, further comprising: receiving, during the first training sequence, a set of training tones from the downhole telemetry module via the communication link; and measuring a respective power of a first training tone of the set of training tones and a second training tone of the set of training tones.

Clause 3: The method of Clause 2, wherein the second bandwidth is automatically selected when the power of the first training tone and the power of the second training tone satisfy a predetermined condition.

Clause 4: The method of Clause 3, wherein the predetermined condition comprises a difference between the power of the first training tone and the power of the second training tone being greater than a threshold.

Clause 5: The method according to any of Clauses 2-4, further comprising initiating a second training sequence with the downhole telemetry module at the second bandwidth, after initiating the first training sequence and prior to exchanging data with the downhole telemetry module during the communication session.

Clause 6: The method of Clause 5, further comprising: determining, during the second training sequence, one or more metrics indicative of a quality of the communication link; determining, a usable portion of the second bandwidth for the communication link, based on the one or more metrics; allocating available transmission power to the usable portion of the second bandwidth; and initiating a third training sequence with the downhole telemetry module, based on the transmission power allocated to the usable portion of the second bandwidth, after initiating the second training sequence and prior to exchanging data with the downhole telemetry module during the communication session.

Clause 7: The method of Clause 6, wherein: the second bandwidth comprises a plurality of subcarriers; the usable portion of the second bandwidth comprises a first set of subcarriers of the plurality of subcarriers; and allocating the available transmission power to the usable portion of the second bandwidth comprises reallocating transmission power from a second set of subcarriers of the plurality of subcarriers to the first set of subcarriers.

Clause 8: The method according to any of Clauses 6-7, wherein the one or more metrics comprise a signal-to-noise ratio (SNR) of the communication link.

Clause 9: The method according to any of Clauses 6-8, further comprising adjusting, during the third training sequence, a receiver gain of the surface acquisition module based at least in part on the transmission power allocated to the usable portion of the second bandwidth.

Clause 10: The method according to any of Clauses 1-9, wherein exchanging data with the downhole telemetry module comprises: receiving, from the downhole telemetry module, an indication of a bit allocation table (BAT) update; and dynamically allocating data among a set of subcarriers within the second bandwidth, based on the BAT update.

Clause 11: The method of Clause 10, wherein the BAT update is based on a respective signal-to-noise ratio (SNR) of each subcarrier of the set of subcarriers.

Clause 12: The method according to any of Clauses 10-11, wherein dynamically allocating the data among the set of subcarriers comprises moving a number of bits from a first subcarrier within the set of subcarriers to a second subcarrier within the set of subcarriers.

Clause 13: The method of Clause 12, wherein the first subcarrier has an SNR margin less than an SNR margin of the second subcarrier.

Clause 14: The method according to any of Clauses 10-13, further comprising receiving a bit-swapping request from the downhole telemetry module during the communication session, wherein dynamically allocating the data among the set of subcarriers comprises: dynamically allocating the data among the set of subcarriers in response to the bit-swapping request; and refraining from sending an acknowledgment to the downhole telemetry module after dynamically allocating the data among the set of subcarriers.

Clause 15: The method of Clause 14, wherein bit-swapping request is included within an acknowledgment message.

Clause 16: The method according to any of Clauses 1-15, wherein: exchanging data with the downhole telemetry module comprises transmitting data to the downhole telemetry module using an error control coding scheme; and using the error control coding scheme comprises: performing a first set of operations of the error control coding scheme via a first processor; and offloading a second set of operations of the error control coding scheme to a second processor.

Clause 17: The method of Clause 16, wherein the error control coding scheme comprises trellis coded modulation.

Clause 18: A method performed by a downhole telemetry module in a discrete multitone (DMT) modulation system, the method comprising: initiating a first training sequence with a surface acquisition module at a first bandwidth of a plurality of bandwidths via a communication link between the surface acquisition module and the downhole telemetry module; automatically selecting a second bandwidth of the plurality of bandwidths for a communication session between the surface acquisition module and the downhole telemetry module using the communication link, based on the first training sequence, the second bandwidth being greater than the first bandwidth; and exchanging data with the surface acquisition module during the communication session according to the second bandwidth.

Clause 19: The method of Clause 18, further comprising: determining, during the first training sequence, one or more metrics indicative of a quality of the communication link; determining, a usable portion of the first bandwidth for the communication link, based on the one or more metrics; allocating available transmission power to the usable portion of the first bandwidth; and initiating a second training sequence with the surface acquisition module, based on the transmission power allocated to the usable portion of the first bandwidth, after initiating the first training sequence and prior to exchanging data with the surface acquisition module during the communication session.

Clause 20: A surface acquisition module for a discrete multitone (DMT) modulation system, the surface acquisition module comprising: one or more memories collectively storing instructions; and one or more processors communicatively coupled to the one or more memories, the one or more processors being collectively configured to execute the instructions to cause the surface acquisition module to: initiate a first training sequence with a downhole telemetry module at a first bandwidth of a plurality of bandwidths via a communication link between the surface acquisition module and the downhole telemetry module; automatically select a second bandwidth of the plurality of bandwidths for a communication session between the surface acquisition module and the downhole telemetry module using the communication link, based on the first training sequence, the second bandwidth being greater than the first bandwidth; and exchange data with the downhole telemetry module during the communication session according to the second bandwidth.

Clause 21: A surface acquisition module comprising: one or more memories collectively storing executable instructions; and one or more processors coupled to the one or more memories, the one or more processors being collectively configured to execute the executable instructions and cause the surface acquisition module to perform a method in accordance with any of Clauses 1-17.

Clause 22: A non-transitory computer-readable medium comprising computer-executable instructions that, when executed by one or more processors of a surface acquisition module, cause the surface acquisition module to perform a method in accordance with any of Clauses 1-17.

Clause 23: An apparatus comprising means for performing a method in accordance with any of Clauses 1-17.

Clause 24: A downhole telemetry module comprising: one or more memories collectively storing executable instructions; and one or more processors coupled to the one or more memories, the one or more processors being collectively configured to execute the executable instructions and cause the downhole telemetry module to perform a method in accordance with any of Clauses 18-19.

Clause 25: A non-transitory computer-readable medium comprising computer-executable instructions that, when executed by one or more processors of a surface acquisition module, cause the surface acquisition module to perform a method in accordance with any of Clauses 18-19.

Clause 26: An apparatus comprising means for performing a method in accordance with any of Clauses 18-19.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, "a processor," "at least one processor," or "one or more processors" generally refer to a single processor configured to perform one or multiple operations or multiple processors configured to collectively perform one or more operations. In the case of multiple processors, performance of the one or more operations could be divided amongst different processors, though one processor may perform multiple operations, and multiple processors could collectively perform a single operation. Similarly, "a memory," "at least one memory," or "one or more memories" generally refer to a single memory configured to store data and/or instructions or multiple memories configured to collectively store data and/or instructions.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an ASIC, or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method performed by a surface acquisition module in a discrete multitone modulation (DMT) system, the method comprising:

initiating a first training sequence with a downhole telemetry module using a first bandwidth of a plurality of bandwidths via a communication link between the surface acquisition module and the downhole telemetry module;

receiving, during the first training sequence, a set of training tones from the downhole telemetry module via the communication link;

measuring a respective power of a first training tone of the set of training tones and a second training tone of the set of training tones;

automatically selecting a second bandwidth of the plurality of bandwidths for a communication session between the surface acquisition module and the downhole telemetry module using the communication link, based on the first training sequence, the second bandwidth being greater than the first bandwidth, and the second bandwidth being automatically selected when the power of the first training tone and the power of the second training tone satisfy a predetermined condition; and exchanging data with the downhole telemetry module during the communication session based on the second bandwidth.

2. The method of claim 1, wherein the predetermined condition comprises a difference between the power of the first training tone and the power of the second training tone being greater than a threshold.

3. The method of claim 1, further comprising initiating a second training sequence with the downhole telemetry module at the second bandwidth, after initiating the first training sequence and prior to exchanging data with the downhole telemetry module during the communication session.

4. The method of claim 3, further comprising:

determining, during the second training sequence, one or more metrics indicative of a quality of the communication link;

determining a usable portion of the second bandwidth for the communication link, based on the one or more metrics;

allocating available transmission power to the usable portion of the second bandwidth; and initiating a third training sequence with the downhole telemetry module, based on the transmission power allocated to the usable portion of the second bandwidth, after initiating the second training sequence and prior to exchanging data with the downhole telemetry module during the communication session.

5. The method of claim 4, wherein:

the second bandwidth comprises a plurality of subcarriers;

the usable portion of the second bandwidth comprises a first set of subcarriers of the plurality of subcarriers; and allocating the available transmission power to the usable portion of the second bandwidth comprises reallocating transmission power from a second set of subcarriers of the plurality of subcarriers to the first set of subcarriers.

6. The method of claim 4, wherein the one or more metrics comprise a signal-to-noise ratio (SNR) of the communication link.

7. The method of claim 4, further comprising adjusting, during the third training sequence, a receiver gain of the surface acquisition module based at least in part on the transmission power allocated to the usable portion of the second bandwidth.

8. The method of claim 1, wherein exchanging data with the downhole telemetry module comprises:

receiving, from the downhole telemetry module, an indication of a bit allocation table (BAT) update; and dynamically allocating data among a set of subcarriers within the second bandwidth, based on the BAT update.

9. The method of claim 8, wherein the BAT update is based on a respective signal-to-noise ratio (SNR) of each subcarrier of the set of subcarriers.

10. The method of claim 9, wherein dynamically allocating the data among the set of subcarriers comprises moving a number of bits from a first subcarrier within the set of subcarriers to a second subcarrier within the set of subcarriers.

11. The method of claim 10, wherein the first subcarrier has an SNR margin less than an SNR margin of the second subcarrier.

12. The method of claim 8, further comprising receiving a bit-swapping request from the downhole telemetry module during the communication session, wherein dynamically allocating the data among the set of subcarriers comprises:

dynamically allocating the data among the set of subcarriers in response to the bit-swapping request; and refraining from sending an acknowledgment to the downhole telemetry module after dynamically allocating the data among the set of subcarriers.

13. The method of claim 12, wherein the bit-swapping request is included within an acknowledgment message.

14. The method of claim 1, wherein:

exchanging data with the downhole telemetry module comprises transmitting data to the downhole telemetry module using an error control coding scheme; and using the error control coding scheme comprises:

performing a first set of operations of the error control coding scheme via a first processor; and offloading a second set of operations of the error control coding scheme to a second processor.

15. The method of claim 14, wherein the error control coding scheme comprises trellis coded modulation.

16. A surface acquisition module for a discrete multitone modulation (DMT) system, the surface acquisition module comprising:

one or more memories collectively storing instructions; and one or more processors communicatively coupled to the one or more memories, the one or more processors being collectively configured to execute the instructions to cause the surface acquisition module to:

initiate a first training sequence with a downhole telemetry module at a first bandwidth of a plurality of bandwidths via a communication link between the surface acquisition module and the downhole telemetry module;

receive, during the first training sequence, a set of training tones from the downhole telemetry module via the communication link;

measure a respective power of a first training tone of the set of training tones and a second training tone of the set of training tones;

automatically select a second bandwidth of the plurality of bandwidths for a communication session between the surface acquisition module and the downhole telemetry module using the communication link, based on the first training sequence, the second bandwidth being greater than the first bandwidth, and the second bandwidth being automatically selected when the power of the first training tone and the power of the second training tone satisfy a predetermined condition; and exchange data with the downhole telemetry module during the communication session according to the second bandwidth.

17. The surface acquisition module of claim 16, wherein the predetermined condition comprises a difference between the power of the first training tone and the power of the second training tone being greater than a threshold.

18. The surface acquisition module of claim 16, wherein the one or more processors are collectively further configured to execute the instructions to cause the surface acquisition module to initiate a second training sequence with the downhole telemetry module at the second bandwidth, after initiating the first training sequence and prior to exchanging data with the downhole telemetry module during the communication session.

19. The surface acquisition module of claim 18, wherein the one or more processors are collectively further configured to execute the instructions to cause the surface acquisition module to:

determine, during the second training sequence, one or more metrics indicative of a quality of the communication link;

determine a usable portion of the second bandwidth for the communication link, based on the one or more metrics;

allocate available transmission power to the usable portion of the second bandwidth; and initiate a third training sequence with the downhole telemetry module, based on the transmission power allocated to the usable portion of the second bandwidth, after initiating the second training sequence and prior to exchanging data with the downhole telemetry module during the communication session.

20. The surface acquisition module of claim 19, wherein:

the second bandwidth comprises a plurality of subcarriers;

the usable portion of the second bandwidth comprises a first set of subcarriers of the plurality of subcarriers; and allocating the available transmission power to the usable portion of the second bandwidth comprises reallocating transmission power from a second set of subcarriers of the plurality of subcarriers to the first set of subcarriers.

* * * * *